US012614643B2

(12) United States Patent
Muller

(10) Patent No.: US 12,614,643 B2
(45) Date of Patent: Apr. 28, 2026

(54) NUCLEAR REACTOR SYSTEM INSIDE A BOREHOLE

(71) Applicant: Deep Fission, Inc., Berkeley, CA (US)

(72) Inventor: Richard A. Muller, Berkeley, CA (US)

(73) Assignee: Deep Fission, Inc., Berkeley, CA (US)

( * ) Notice: Subject to any disclaimer, the term of this patent is extended or adjusted under 35 U.S.C. 154(b) by 0 days.

(21) Appl. No.: 18/703,455

(22) PCT Filed: Nov. 1, 2023

(86) PCT No.: PCT/US2023/036605
§ 371 (c)(1),
(2) Date: Apr. 22, 2024

(87) PCT Pub. No.: WO2024/097297
PCT Pub. Date: May 10, 2024

(65) Prior Publication Data

US 2025/0259757 A1 Aug. 14, 2025

Related U.S. Application Data

(60) Provisional application No. 63/479,220, filed on Jan. 10, 2023, provisional application No. 63/421,444, filed on Nov. 1, 2022.

(51) Int. Cl.
*G21C 15/12* (2006.01)
*G21C 15/02* (2006.01)
(Continued)

(52) U.S. Cl.
CPC ............ *G21C 15/12* (2013.01); *G21C 15/02* (2013.01); *G21C 15/243* (2013.01);
(Continued)

(58) Field of Classification Search
CPC ...... G21C 15/12; G21C 15/02; G21C 15/243; G21C 15/257; G21C 1/322; G21C 11/06; E21B 41/00
(Continued)

(56) References Cited

U.S. PATENT DOCUMENTS 3,080,918 A 3/1963 Natland
3,170,842 A 2/1965 Kehler
(Continued)

FOREIGN PATENT DOCUMENTS

CN 1973339 5/2007
CN 101124640 2/2008
(Continued)

OTHER PUBLICATIONS

Kammer, "Underground nuclear power plants with surface turbine generators", Nuclear Engineering and Design 33, No. 3 (1975): 308-335. (Year: 1975).*
(Continued)

*Primary Examiner* — Jack W Keith
*Assistant Examiner* — Daniel Wasil
(74) *Attorney, Agent, or Firm* — Fish & Richardson P.C.

(57) ABSTRACT

A nuclear reactor system includes a drillhole that extends from a terranean surface through one or more subterranean formations. The nuclear reactor system includes a reactor core positioned in the drillhole, the reactor core comprising at least one nuclear fuel element. The nuclear reactor system includes a primary coolant system configured to transport a primary fluid coolant between the reactor core and a heat exchanger. The nuclear reactor system includes a secondary coolant system thermally coupled to the primary coolant system via the heat exchanger and configured to transport a secondary fluid coolant between the heat exchanger and the terranean surface.

49 Claims, 7 Drawing Sheets

(51) Int. Cl.

| | |
|---|---|
| ***G21C 15/243*** | (2006.01) |
| ***G21C 15/257*** | (2006.01) |
| *E21B 41/00* | (2006.01) |
| *F24T 10/10* | (2018.01) |
| *G21C 1/32* | (2006.01) |
| *G21C 3/08* | (2006.01) |
| *G21C 5/10* | (2006.01) |
| *G21C 7/22* | (2006.01) |
| *G21C 11/06* | (2006.01) |
| *G21D 1/00* | (2006.01) |
| *G21D 9/00* | (2006.01) |

(52) U.S. Cl.
CPC ............ *G21C 15/257* (2013.01); *E21B 41/00* (2013.01); *E21B 41/0085* (2013.01); *F24T 10/10* (2018.05); *G21C 1/322* (2013.01); *G21C 3/08* (2013.01); *G21C 5/10* (2013.01); *G21C 7/22* (2013.01); *G21C 11/06* (2013.01); *G21D 1/00* (2013.01); *G21D 9/00* (2013.01)

(58) Field of Classification Search
USPC .......................................................... 376/273
See application file for complete search history.

(56) References Cited

U.S. PATENT DOCUMENTS

| | | | | | |
|---|---|---|---|---|---|
| 3,219,537 | A | * | 11/1965 | Janner .................... | G21C 1/326 376/325 |
| 3,236,739 | A | * | 2/1966 | Lange .................... | G21C 1/322 976/DIG. 174 |
| 3,278,386 | A | | 10/1966 | French | |
| 3,341,424 | A | | 9/1967 | Schlicht et al. | |
| 3,356,589 | A | | 12/1967 | Grell et al. | |
| 3,377,207 | A | * | 4/1968 | Stathoplos ............. | G21C 1/322 136/202 |
| 3,379,013 | A | | 4/1968 | Slagle et al. | |
| 3,755,076 | A | | 8/1973 | Lindsley | |
| 3,899,631 | A | | 8/1975 | Clark | |
| 4,537,740 | A | | 8/1985 | Colburn | |
| 4,708,522 | A | | 11/1987 | Bergman et al. | |
| 4,851,183 | A | | 7/1989 | Hampel | |
| 4,886,393 | A | | 12/1989 | Jahn-Held et al. | |
| 5,133,624 | A | | 7/1992 | Cahill | |
| 5,165,235 | A | | 11/1992 | Nitschke | |
| 5,202,522 | A | | 4/1993 | Williams | |
| 5,318,382 | A | | 6/1994 | Cahill | |
| 5,340,235 | A | | 8/1994 | Milliken | |
| 5,377,104 | A | | 12/1994 | Sorrells et al. | |
| 5,387,741 | A | | 2/1995 | Shuttle | |
| 5,489,739 | A | | 2/1996 | Curry et al. | |
| 5,589,603 | A | | 12/1996 | Alexander et al. | |
| 5,785,133 | A | | 7/1998 | Murray et al. | |
| 5,850,614 | A | | 12/1998 | Crichlow | |
| 5,863,283 | A | | 1/1999 | Gardes | |
| 5,868,210 | A | | 2/1999 | Johnson et al. | |
| 6,002,063 | A | | 12/1999 | Bilak et al. | |
| 6,238,138 | B1 | | 5/2001 | Crichlow | |
| 7,068,748 | B2 | | 6/2006 | Singh | |
| 7,287,934 | B2 | | 10/2007 | Okutsu et al. | |
| 8,933,289 | B2 | | 1/2015 | Crichlow | |
| 9,115,575 | B2 | | 8/2015 | Macadam et al. | |
| 9,852,822 | B2 | | 12/2017 | Singh | |
| 10,002,683 | B2 | | 6/2018 | Muller et al. | |
| 10,265,743 | B1 | | 4/2019 | Muller et al. | |
| 10,300,512 | B2 | | 5/2019 | Muller et al. | |
| 10,315,238 | B1 | | 6/2019 | Muller et al. | |
| 10,434,550 | B1 | | 10/2019 | Muller | |
| 10,446,287 | B2 | | 10/2019 | Singh | |
| 10,614,927 | B2 | | 4/2020 | Muller et al. | |
| 10,692,618 | B2 | | 6/2020 | Muller | |
| 10,751,769 | B1 | | 8/2020 | Muller et al. | |
| 10,861,614 | B2 | | 12/2020 | Muller et al. | |
| 10,878,972 | B2 | | 12/2020 | Muller | |
| 10,921,301 | B2 | | 2/2021 | Muller et al. | |
| 10,926,306 | B2 | | 2/2021 | Muller et al. | |
| 10,940,512 | B2 | | 3/2021 | Muller et al. | |
| 10,943,706 | B2 | | 3/2021 | Muller | |
| 11,135,629 | B2 | | 10/2021 | Muller et al. | |
| 11,158,434 | B2 | | 10/2021 | Payor et al. | |
| 11,289,230 | B2 | | 3/2022 | Muller | |
| 11,338,337 | B2 | | 5/2022 | Muller et al. | |
| 11,338,338 | B2 | | 5/2022 | Muller | |
| 11,488,736 | B2 | | 11/2022 | Muller | |
| 11,536,472 | B2 | * | 12/2022 | Ballegeer .............. | F24F 5/0046 |
| 11,666,953 | B2 | | 6/2023 | Muller et al. | |
| 11,837,373 | B2 | | 12/2023 | Muller | |
| 11,837,375 | B2 | | 12/2023 | Muller et al. | |
| 11,842,822 | B2 | | 12/2023 | Muller | |
| 2002/0020528 | A1 | | 2/2002 | McCabe et al. | |
| 2005/0207525 | A1 | | 9/2005 | Singh | |
| 2008/0039673 | A1 | | 2/2008 | Maksimov | |
| 2008/0308271 | A1 | | 12/2008 | Chouzenoux et al. | |
| 2009/0135986 | A1 | | 5/2009 | Georgii | |
| 2010/0105975 | A1 | | 4/2010 | Baird | |
| 2010/0234663 | A1 | | 9/2010 | Crichlow | |
| 2011/0005762 | A1 | | 1/2011 | Poole | |
| 2011/0054234 | A1 | | 3/2011 | Georgii | |
| 2011/0290483 | A1 | | 12/2011 | Zornes | |
| 2014/0174081 | A1 | | 6/2014 | Hine | |
| 2014/0221722 | A1 | | 8/2014 | Germanovich et al. | |
| 2016/0258226 | A1 | | 9/2016 | Clemens et al. | |
| 2017/0186505 | A1 | | 6/2017 | Muller et al. | |
| 2018/0144841 | A1 | | 5/2018 | Singh | |
| 2018/0182504 | A1 | | 6/2018 | Muller et al. | |
| 2018/0345336 | A1 | | 12/2018 | Muller et al. | |
| 2019/0099790 | A1 | | 4/2019 | Muller et al. | |
| 2019/0318838 | A1 | | 10/2019 | Muller et al. | |
| 2020/0023416 | A1 | | 1/2020 | Muller et al. | |
| 2020/0027607 | A1 | | 1/2020 | Muller | |
| 2020/0194140 | A1 | | 6/2020 | Payor et al. | |
| 2020/0211727 | A1 | | 7/2020 | Muller et al. | |
| 2020/0271632 | A1 | | 8/2020 | Muller et al. | |
| 2020/0273591 | A1 | | 8/2020 | Muller | |
| 2020/0273593 | A1 | | 8/2020 | Muller et al. | |
| 2020/0357532 | A1 | | 11/2020 | Muller | |
| 2020/0391260 | A1 | | 12/2020 | Muller | |
| 2021/0041410 | A1 | | 2/2021 | Muller et al. | |
| 2021/0110944 | A1 | | 4/2021 | Lopez et al. | |
| 2021/0276057 | A1 | | 9/2021 | Muller et al. | |
| 2021/0287820 | A1 | | 9/2021 | Muller | |
| 2021/0333256 | A1 | | 10/2021 | Muller et al. | |
| 2021/0343440 | A1 | | 11/2021 | Muller | |
| 2022/0080481 | A1 | | 3/2022 | Muller et al. | |
| 2022/0157482 | A1 | | 5/2022 | Finsterle et al. | |
| 2022/0223308 | A1 | | 7/2022 | Muller | |
| 2022/0288658 | A1 | | 9/2022 | Muller | |
| 2022/0367080 | A1 | | 11/2022 | Muller et al. | |
| 2022/0402004 | A1 | | 12/2022 | Muller et al. | |
| 2023/0130489 | A1 | | 4/2023 | Muller | |
| 2023/0408001 | A1 | | 12/2023 | Muller | |
| 2023/0411031 | A1 | | 12/2023 | Muller | |
| 2024/0003226 | A1 | | 1/2024 | Muller | |
| 2024/0013945 | A1 | | 1/2024 | Muller | |
| 2024/0105353 | A1 | | 3/2024 | Muller | |
| 2024/0339231 | A1 | | 10/2024 | Muller et al. | |

FOREIGN PATENT DOCUMENTS

| | | |
|---|---|---|
| CN | 101971268 | 2/2011 |
| CN | 106782735 | 5/2017 |
| GB | 2104713 | 3/1983 |
| GB | 2151839 | 7/1985 |
| GB | 8512768 | 1/1986 |
| GB | 2609628 | 2/2023 |
| JP | S 58-042945 | 3/1983 |
| JP | 2000231000 | 8/2000 |
| JP | 2003028991 | 1/2003 |
| JP | 2005091070 | 4/2005 |
| JP | 2005245261 | 9/2005 |
| JP | 2006035068 | 2/2006 |
| JP | 2006170690 | 6/2006 |
| JP | 4902877 | 1/2012 |

(56) References Cited

FOREIGN PATENT DOCUMENTS

| | | | | |
|---|---|---|---|---|
| TW | I 484502 | | 5/2015 | |
| WO | WO 1981001055 | | 4/1981 | |
| WO | WO 1992007667 | | 5/1992 | |
| WO | WO 2010007305 | | 1/2010 | |
| WO | WO-2012145855 | A2 * | 11/2012 | ............ G21C 11/00 |
| WO | WO 2015069300 | | 5/2015 | |
| WO | WO 2016177876 | | 11/2016 | |
| WO | WO 2017112479 | | 6/2017 | |
| WO | WO 2021237137 | | 11/2021 | |

OTHER PUBLICATIONS

Pusch, "Deep Boreholes for Storage of Spent Reactor Fuel and Use of the Heated Rock for Production of Electric Energy or hot fluid for heating purposes", Earth Sciences and Geotechnical Engineering 10, No. 1 (2020): 127-153. (Year: 2020).*

Beier, "Transient heat transfer in a coaxial borehole heat exchanger", Geothermics 51 (2014): 470-482. (Year: 2014).*

Pusch et al., "Deep Boreholes for Storage of Spent Reactor Fuel and Use of the Heated Rock for Production of Electric Energy or hot fluid for heating purposes," Earth Sciences and Geotechnical Engineering, Jan. 2020, 10(1):127-153.

Apokalypsis, Classical Greek: to reveal or uncover that which was hidden or buried, Martin Spencer Garthwaite, iUniverse, (ed.) 2019 (2001), 377 pages.

Email from M. Garthwaite to Attorney Matthew Wernli, dated Jan. 8, 2025.

Ronen et al., "The smallest thermal nuclear reactor," Nuclear Science and Engineering, May 2006, 153(1):90-2.

www.apokalypsis.com [online], "Apokalypsis Classical Greek: to reveal that which was hidden," retrieved Feb. 11, 2025, retrieved from URL<https://www.apokalypsis.com/>, 2 pages.

Arnold et al., "Reference Design and Operations of Deep Borehole Disposal of High-Level Radioactive Waste," Sandia National Laboratories, Oct. 2011, retrieved from <http://prod.sandia.gov/techlib/access-control.cgi/2011/116749.pdf>, 67 pages.

Cornwall, "Deep Sleep. Boreholes drilled into Earth's crust get a fresh look for nuclear waste disposal," Science, Jul. 10, 2015, 349(6244):132-135.

Dozier, "Feasibility of Very Deep Borehole Disposal of US Nuclear Defense Wastes," Massachusetts Institute of Technology, Sep. 2011, pp. 1-12.

Faybishenko et al., "International Approaches for Deep Geological Disposal of Nuclear Waste: Geological Challenges in Radioactive Waste Isolation", Lawrence Berkeley National Laboratory and Sandia National Laboratories: prepared for the US Department of Energy, Fifth Worldwide Review, Dec. 2016, 474 pages.

Gibb et al., "A Model for Heat Flow in Deep Borehole Disposals of High-Level Nuclear Waste," Journal of Geophysical Research, May 6, 2008, 113(1): B05201, 18 pages.

Gibbs, "Feasibility of Lateral Emplacement in Very Deep Borehole Disposal of High Level Nuclear Waste," master's thesis, Massachusetts Institute of Technology, Sep. 1, 2010, 154 pages.

Hoag, "Canister Design for Deep Borehole Disposal of Nuclear Waste," Massachusetts Institute of Technology, May 2006, pp. 1-6.

Hurd, "Choosing and Using a Form Release Agent," Concrete Construction, Oct. 1996, 41(10):732-736.

International Search Report and Written Opinion in International Application No. PCT/US2018/035974, mailed on Aug. 24, 2018, 13 pages.

International Search Report and Written Opinion in International Appln. No. PCT/US2023/036605, mailed on Mar. 26, 2024, 9 pages.

International Search Report and Written Opinion issued in International Application No. PCT/US2016/066539, mailed on Apr. 19, 2017, 13 pages.

Korean Notice of Final Rejection in KR Appln. No. 1020207000246, mailed on Dec. 14, 2021, 7 pages (with English Translation).

Neuzil et al., "Shale: An overlooked option forUS nuclear waste disposal," Bulletin of the Atomic Scientists, Nov. 2014, Retrieved from URL< http://thebulletin.org/shale-overlooked-option-us-nuclear-waste-disposal7831>, 5 pages.

Neuzil, "Can Shale Safely Host U.S. Nuclear Waste?," EOS. Jul. 23, 2013, 94(30):1-3.

Office Action in Chinese Appln. No. 201880049476, mailed on Dec. 11, 2020, 9 pages.

Office Action in Japanese Appln. No. 2018-552636, mailed on Apr. 27, 2021, 7 pages (with English Translation).

Office Action in Taiwanese Appln. No. 107119231, mailed on Dec. 23, 2021, 109 pages (with English Translation).

Sone and Zoback, "Mechanical properties of shale-gas reservoir rocks—Part 1: Static and dynamic elastic properties and anisotropy," Geophysics, Sep. 2013, 78(5):D381-92.

United States Department of Energy, "Performance Confirmation Concepts Study Report, Civilian Radioactive Waste Management System Management & Operating Contractor," TRW Enviromental Saftety System, Inc., Nov. 1996, 331 pages.

United States Department of Energy, "A Report to the U.S. Congress and the Secretary of Energy, Evaluation of Technical Issues Associated With the Development of a Separate Repository for U.S. Department of Energy-Managed High-Level Radioactive Waste and Spent Nuclear Fuel," U.S. Nuclear Waste Technical Review Board, Jun. 2015, 30 pages.

United States Department of Energy, "Executive Summary—Environmental Impact Statement, Waste Isolation Pilot Plant (WIPP)," Carlsbad Field Office, Oct. 1980, 1544 pages.

United States Department of Energy, "Quality Assurance Program Document, DOE/CBFO-94-1012 Revision 13," Carlsbad Field Office, Apr. 20, 2017, 127 pages.

United States Department of Energy, "Safety Evaluation Report Addendum for Annual Update of Waste Isolation Plant, Document Safety Analysis, Revision 6, and Technical Safety Requirements, Revision 6," Carlsbad Field Office, Feb. 26, 2018, 55 pages.

United States Department of Energy, "Safety Evaluation Report for Approval of DOE/WIPP 07-3372, Waste Isolation Plant Documented Safety Analysis, Revision 5 and DOE/WIPP 07-3373, Waste Isolation Pilot Plant Technical Safety Requirements, Revision 5," Carlsbad Field Office, Apr. 29, 2016, 235 pages.

United States Department of Energy, "Waste Isolation Plant, Documented Safety Analysis," Nuclear Waste Partnership LLC Carlsbad, NM, Feb. 2018, 777 pages.

United States Department of Energy, "Waste Isolation Plant, Final Supplement, Environmental Impact Statement," Office of Environmental Restoration and Waste Management, Jan. 1990, 1498 pages.

United States Department of Energy, "Waste Isolation Plant, Final Technical Safety Requirements," Nuclear Waste Partnership LLC Carlsbad, NM, Feb. 2018, 291 pages.

United States Department of Energy, "Waste Isolation Pilot Plant, Environmental Monitoring Plan, Revision 10," Carlsbad Field Office, Jun. 22, 2017, 56 pages.

Vartabedian, "Decades-old war over Yucca Mountain nuclear dump resumes under Trump budget plan," The San Diego Union-Tribune News, Mar. 29, 2017, 4 pages.

Winterle et al., "Regulatory Perspectives on Deep Borehole Disposal Concepts," prepared for the U.S. Nuclear Regulatory Commission, Contract NRC-02-07006, Center for Nuclear Waste Regulatory Analyses, San Antonio, TX, May 2011, 24 pages.

world-nuclear-news.org [online], "Yucca Mountain cost estimate rises to $96 billion", World nuclear news, Aug. 6, 2008, retrieved from URL<https://www.world-nuclear-news.org/WR-Yucca_Mountain_cost_estimate_rises_to_96_billion_dollars-0608085.html>, 2 pages.

YuccaMountain.org [online], "Eureka County, Nevada - Nuclear Waste Office, FAQ, Eureka County Home," last updated on Mar. 17, 2017, retrieved from URL<https://www.yuccamountain.org/faq.htm>, 12 pages.

* cited by examiner

NUCLEAR REACTOR SYSTEM INSIDE A BOREHOLE

CROSS-REFERENCE TO RELATED APPLICATIONS

This application is a National Phase Application under 35 U.S.C. § 371 of International Patent Application No. PCT/US2023/036605, filed on Nov. 1, 2023, which claims priority to U.S. Provisional Patent Application Ser. No. 63/479,220, filed on Jan. 10, 2023, and to U.S. Provisional Patent Application Ser. No. 63/421,444, filed on Nov. 1, 2022. The entire contents of all prior applications are incorporated herein by reference.

TECHNICAL BACKGROUND

This disclosure relates to systems and methods for generating power from a fission reactor formed by placing fissile material in a drillhole.

BACKGROUND

Highly radioactive material, such as radioactive waste, chemical waste, biologic waste, or other waste that is generally harmful to living creatures whether directly or indirectly, can be placed underground within (or outside of) canister systems. As an example, radioactive waste (also referred to as nuclear waste) can be stored in deep, human-unoccupiable drillholes that are formed from a terranean surface into one or more subterranean formations that are suitable to store such waste for years, decades, centuries, or longer. For instance, the human-unoccupiable drillholes (also called boreholes or wellbores) can be directional drillholes formed with conventional drilling equipment and include vertical, curved, and horizontal portions (including multilaterals in some cases). Alternatively, the human-unoccupiable drillholes can be substantially vertical or slanted (e.g., formed offset from substantially vertical). The isolation afforded by such boreholes suggests that they can be used, not only for the disposal of dangerous material, but as a site for the operation of a nuclear power plant.

SUMMARY

In an example implementation, a nuclear reactor system includes a drillhole that extends from a terranean surface through one or more subterranean formations; a reactor core positioned in the drillhole, the reactor core including at least one nuclear fuel element; a primary coolant system configured to transport a primary fluid coolant between the reactor core and a heat exchanger; and a secondary coolant system thermally coupled to the primary coolant system with the heat exchanger and configured to transport a secondary fluid coolant between the heat exchanger and the terranean surface.

In an aspect combinable with the example implementation, the at least one nuclear fuel element includes a fissile nuclear fuel element.

In another aspect combinable with any of the previous aspects, the fissile fuel element includes at least one of enriched uranium, plutonium, uranium or plutonium oxide, or a mixed oxide (MOX).

Another aspect combinable with any of the previous aspects includes at least one canister that at least partially encloses the at least one nuclear fuel element.

In another aspect combinable with any of the previous aspects, the canister includes a first opening an uphole end of the canister and a second opening at a downhole end of the canister.

In another aspect combinable with any of the previous aspects, the primary coolant system is configured to transport the primary fluid coolant between the reactor core and the heat exchanger by at least one of natural circulation or pumping.

Another aspect combinable with any of the previous aspects includes one or more pumps configured to provide a force for transporting the primary fluid coolant between the reactor core and the heat exchanger.

In another aspect combinable with any of the previous aspects, the secondary coolant system is configured to transport the secondary fluid coolant between the heat exchanger and the terranean surface by natural circulation.

Another aspect combinable with any of the previous aspects includes one or more pumps configured to provide a force for transporting the secondary fluid coolant between the heat exchanger and the terranean surface.

In another aspect combinable with any of the previous aspects, the primary fluid coolant includes water.

In another aspect combinable with any of the previous aspects, the secondary fluid coolant includes water.

In another aspect combinable with any of the previous aspects, the primary coolant system is fluidly isolated from the second coolant system.

In another aspect combinable with any of the previous aspects, the heat exchanger is configured to transfer heat from the primary fluid coolant in the primary coolant system to heat the secondary fluid coolant in the second coolant system to a higher temperature liquid phase or a gas phase.

Another aspect combinable with any of the previous aspects includes a power conversion system.

In another aspect combinable with any of the previous aspects, the power conversion system is located at or near the terranean surface.

In another aspect combinable with any of the previous aspects, the secondary fluid coolant includes a power conversion working fluid of the power conversion system.

In another aspect combinable with any of the previous aspects, the at least one nuclear fuel element is positioned at a first depth of the drillhole.

In another aspect combinable with any of the previous aspects, the first depth is up to 0.5 km from the terranean surface, 1.0 to 1.5 km from the terranean surface, or 1.5. km or greater from the terranean surface.

In another aspect combinable with any of the previous aspects, the heat exchanger includes a barrier configured to fluidly isolate the primary coolant system from the second coolant system, the barrier being positioned at a second depth of the drillhole, the second depth being less than the first depth.

Another aspect combinable with any of the previous aspects includes one or more pipes extending from the terranean surface to a third depth of the drillhole, the third depth being greater than the second depth.

In another aspect combinable with any of the previous aspects, the one or more pipes is configured to provide the primary fluid coolant to a region of the drillhole below the second depth.

In another aspect combinable with any of the previous aspects, the primary coolant system includes a first pipe having a diameter less than a diameter of the drillhole, the first pipe being positioned in the drillhole with an axis of the first pipe being approximately parallel to an axis of the drillhole, the reactor core being positioned inside the first pipe, the system including an annulus defined between the first pipe and the drillhole, the annulus including a flow circuit configured to convey the primary fluid coolant in a downhole direction to the reactor core.

In another aspect combinable with any of the previous aspects, the secondary coolant system includes a second pipe having a diameter less than the diameter of the drillhole, the second pipe being positioned in the drillhole with an axis of the second pipe being approximately parallel to the axis of the drillhole, the system including an annulus defined between the second pipe and the drillhole, the annulus including a flow circuit configured to convey the secondary fluid coolant in a downhole direction to the heat exchanger.

In another aspect combinable with any of the previous aspects, the secondary coolant system includes a first pipe having a diameter less than the diameter of the drillhole and configured to transport the secondary fluid coolant to the heat exchanger for heating; and a second pipe having a diameter less than the diameter of the drillhole and configured to transport heated secondary fluid coolant from the heat exchanger toward the terranean surface.

In another aspect combinable with any of the previous aspects, a diameter of the drillhole is thirty-six inches or less.

In another aspect combinable with any of the previous aspects, a diameter of the drillhole is four inches or more.

In another aspect combinable with any of the previous aspects, the heat exchanger is positioned within a casing that is installed in the drillhole.

In another aspect combinable with any of the previous aspects, the primary coolant system includes at least one pipe installed external to the casing and to the heat exchanger, and the secondary coolant system includes at least another pipe installed external to the casing.

In another aspect combinable with any of the previous aspects, the casing is installed in the drillhole with a cement layer, and the heat exchanger is installed external to the cement layer.

In another aspect combinable with any of the previous aspects, the reactor core is controllable between a low power output and a maximum power output.

In another aspect combinable with any of the previous aspects, the reactor core is controllable with a fluid that includes a neutron absorber.

In another aspect combinable with any of the previous aspects, the neutron absorber is controllably added to the primary fluid coolant.

In another aspect combinable with any of the previous aspects, the reactor core is controllable with at least one control rod configured to move near or adjacent the at least one nuclear fuel element.

In another aspect combinable with any of the previous aspects, the reactor core is a first reactor core and the nuclear fuel element includes a first nuclear fuel element, the system including a second reactor core positioned in the drillhole, the second reactor core including at least one second nuclear fuel element.

In another aspect combinable with any of the previous aspects, the first and second reactor cores are individually controllable between a low power output and a maximum power output.

In another aspect combinable with any of the previous aspects, each of the first and second reactor cores is individually controllable with a fluid that includes a neutron absorber.

In another aspect combinable with any of the previous aspects, the fluid is individually transported to each of the first and second nuclear reactor cores through one or more tubes that extends from the terranean surface to the first and second nuclear reactor cores.

In another aspect combinable with any of the previous aspects, the neutron absorber is controllably added to the fluid.

In another aspect combinable with any of the previous aspects, each of the first and second reactor cores is individually controllable with respective first and second control rods that are moveable into or near the respective first and second nuclear reactor cores.

Another aspect combinable with any of the previous aspects includes one or more inverted cups positioned in the primary coolant system and within a flowpath of the primary fluid coolant.

In another aspect combinable with any of the previous aspects, the one or more inverted cups are coupled to a cladding of the at least one nuclear fuel element.

Another aspect combinable with any of the previous aspects includes a reflector configured to reflect neutrons generated in the reactor core without absorbing the neutrons.

In another aspect combinable with any of the previous aspects, the reflector includes at least one of beryllium, carbon, a beryllium alloy, or a carbon alloy.

In another aspect combinable with any of the previous aspects, a particular subterranean formation of the one or more subterranean formations that is adjacent the reactor core is configured to act as a reflector to reflect neutrons generated in the reactor core.

In another aspect combinable with any of the previous aspects, the casing is a material sufficient to act as a reflector to reflect neutrons generated in the reactor core.

In another aspect combinable with any of the previous aspects, the material of the casing includes at least one of carbon steel, stainless steel, ceramic, a plastic material, or fiberglass.

In another example implementation, a method of constructing a nuclear reactor system includes forming a drillhole from a terranean surface through one or more subterranean formation; moving at least one nuclear fuel element into the drillhole; positioning the at least one nuclear fuel element at a first depth of the drillhole; moving a heat exchanger into the drillhole, wherein the heat exchanger includes a fluid barrier; and positioning the heat exchanger in the drillhole with the fluid barrier being positioned at a second depth of the drillhole, the second depth being less than the first depth.

In an aspect combinable with the example implementation, the at least one nuclear fuel element includes a fissile nuclear fuel element.

Another aspect combinable with any of the previous aspects includes at least one canister that at least partially encloses the at least one nuclear fuel element.

In another aspect combinable with any of the previous aspects, the canister includes an opening at one or both ends, the method including positioning the canister in the drillhole with an opening facing a downhole direction.

Another aspect combinable with any of the previous aspects includes installing the power conversion system at or near the terranean surface.

Another aspect combinable with any of the previous aspects includes inserting one or more pipes extending from the terranean surface to a third depth of the drillhole, the third depth being greater than the second depth.

In another example implementation, a method includes identifying a nuclear reactor system that includes a drillhole that extends from a terranean surface through one or more subterranean formations; a reactor core positioned in the drillhole, the reactor core including at least one nuclear fuel element; a primary coolant system; and a secondary coolant system thermally coupled to the primary coolant system with a heat exchanger and configured to transport a secondary fluid coolant between the heat exchanger and the terranean surface. The method includes transporting a primary fluid coolant in the primary coolant system between the reactor core and the heat exchanger; transporting a secondary fluid coolant heated in the heat exchanger by the primary fluid coolant in the secondary coolant system between the heat exchanger and the terranean surface; and generating power with the heated secondary fluid coolant.

An aspect combinable with the example implementation includes transporting the primary fluid coolant into a region of the drillhole below a depth of a fluid barrier of the heat exchanger; and transporting the secondary fluid coolant into a region of the drillhole above the depth of the fluid barrier, wherein the fluid barrier fluidly isolates the primary fluid coolant from the second fluid coolant.

Another aspect combinable with any of the previous aspects includes transporting the primary fluid coolant into the drillhole through one or more pipes extending from the terranean surface to a depth of the drillhole that is deeper than the depth of the fluid barrier.

In another aspect combinable with any of the previous aspects, the primary and the secondary fluid coolants include water.

In another example implementation, a nuclear reactor system includes a first drillhole extending from a terranean surface through one or more subterranean formations; a reactor core positioned in the first drillhole, the reactor core including at least one nuclear fuel element; a second drillhole extending from the terranean surface through the one or more subterranean formations and separated from the first drillhole by a portion of a rock formation; a heat exchanger positioned in the second drillhole in thermal communication with the reactor core through the portion of the rock formation; and a coolant system thermally coupled to the heat exchanger and configured to transport a fluid coolant between the heat exchanger and the terranean surface.

In an aspect combinable with the example implementation, the at least one nuclear fuel element includes a fissile nuclear fuel element.

Another aspect combinable with any of the previous aspects includes at least one canister that at least partially encloses the at least one nuclear fuel element.

In another aspect combinable with any of the previous aspects, the canister includes openings at axial ends of the canister.

In another aspect combinable with any of the previous aspects, the coolant system is configured to transport the fluid coolant between the heat exchanger and the terranean surface by natural circulation.

Another aspect combinable with any of the previous aspects includes one or more pumps configured to provide a force for transporting the fluid coolant between the heat exchanger and the terranean surface.

In another aspect combinable with any of the previous aspects, the fluid coolant includes water.

In another aspect combinable with any of the previous aspects, the heat exchanger is configured to transfer heat from the primary coolant system to the fluid coolant in the secondary coolant system.

Another aspect combinable with any of the previous aspects includes a power conversion system.

In another aspect combinable with any of the previous aspects, the power conversion system is located at the terranean surface.

In another aspect combinable with any of the previous aspects, the fluid coolant includes a power conversion working fluid of the power conversion system.

In another aspect combinable with any of the previous aspects, the at least one nuclear fuel element is positioned at a first depth of the first drillhole.

In another aspect combinable with any of the previous aspects, the first depth is less than 0.5 km from the terranean surface, 1.0-1.5 km from the terranean surface, or 1.5 km or greater from the terranean surface.

In another aspect combinable with any of the previous aspects, a diameter of the first drillhole is thirty-six inches or less.

In another aspect combinable with any of the previous aspects, a diameter of the first drillhole is four inches or more.

In another aspect combinable with any of the previous aspects, the reactor core is a first reactor core and the nuclear fuel element includes a first nuclear fuel element, the system including a second reactor core positioned in the first drillhole, the second reactor core including at least one second nuclear fuel element.

In another aspect combinable with any of the previous aspects, the first and second reactor cores are individually controllable between a low power output and a maximum power output.

In another aspect combinable with any of the previous aspects, each of the first and second reactor cores is individually controllable with a fluid that includes a neutron absorber.

In another aspect combinable with any of the previous aspects, the fluid is individually transported to each of the first and second nuclear reactor cores through one or more sets of tubes that extend from the terranean surface to the first and second nuclear reactor cores.

In another aspect combinable with any of the previous aspects, the neutron absorber is controllably added to the fluid.

In another aspect combinable with any of the previous aspects, each of the first and second reactor cores is individually controllable with a control rod assembly that is moveable into or near the respective first and second nuclear reactor cores.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
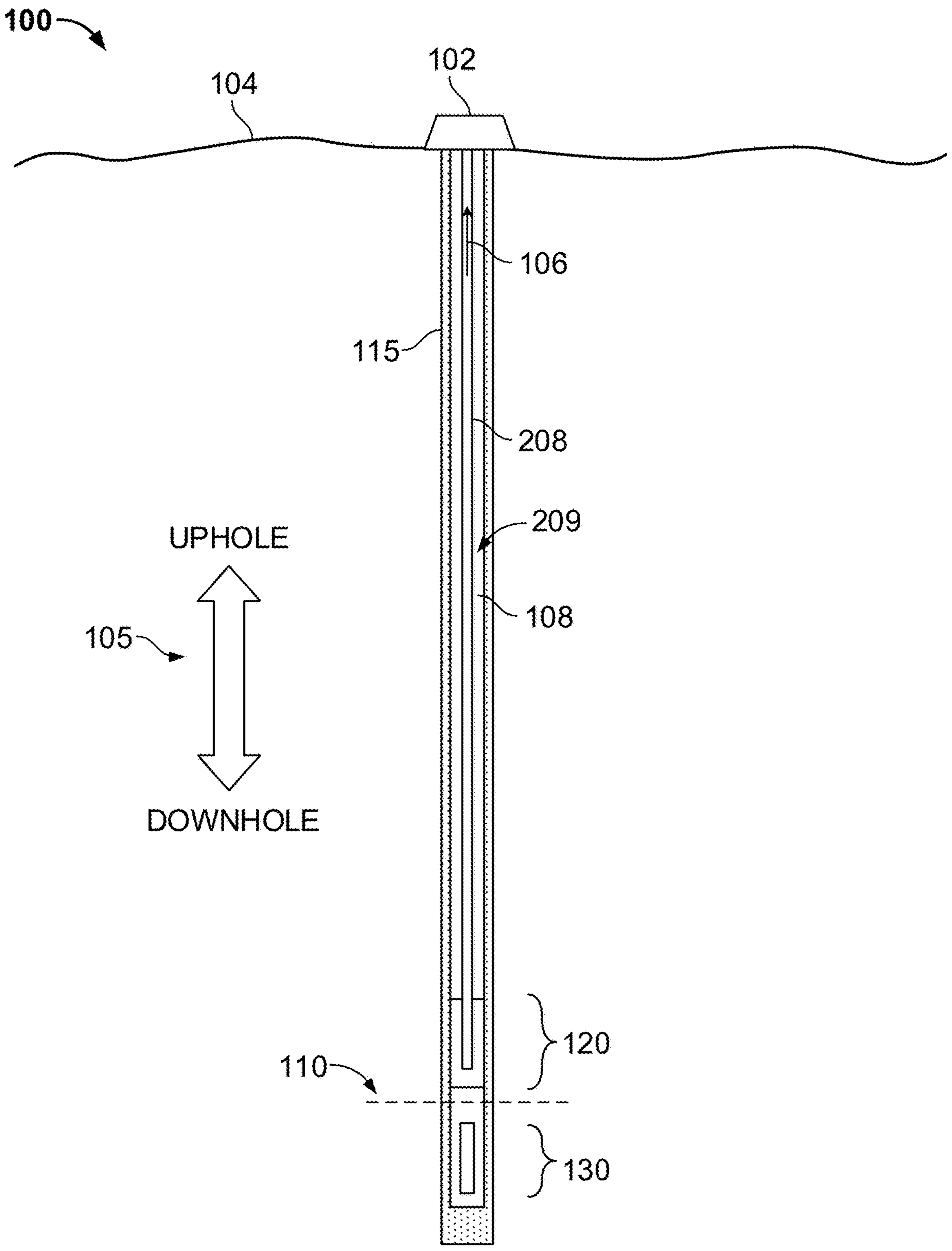
FIGS. 1-3 are schematic diagrams of an example implementation of a drillhole (or borehole) nuclear reactor system according to the present disclosure.

A nuclear fission reactor is described. In general, nuclear fuel stored in canisters in a vertical, slanted, or directional drillhole creates an underground fission reactor to which a power system can be fluidly (e.g., gas, liquid, mixed-phase fluid) coupled to remove thermal energy from the drillhole to bring useful power to the surface or near surface. The reactor fits in a human-unoccupiable drillhole (or borehole) buried deeply in the ground. The example nuclear fission reactors according to the present disclosure can take advantage of the fact that the hydrostatic pressure of the brine in the rock is typically one atmosphere per ten meters. Thus, due to the depth at which nuclear fuel is stored in the drillhole, the nuclear reactor in a borehole at one kilometer (km) will have a pressure of one hundred atmospheres; at 1.5 km the pressure will be one hundred-fifty atmospheres, approximately equal to that of a pressurized water reactor (PWR).

At 150 atmospheres of pressure, water boils at about 325° C. Light water ($H_2O$), heavy water ($D_2O$), other materials containing hydrogen, or a combination can be used for a moderator (e.g., liquids and gases and reactor coolant). The moderator of a nuclear reactor is a substance that slows neutrons. In the example of a light water moderator, collisions between fast neutrons and hydrogen atoms of the water cause the fast neutrons to slow to lower speeds. At lower speeds, the neutrons are more susceptible to propagate a nuclear fission chain reaction.

Control of the rate of the chain reaction can be accomplished physically (such as adding or subtracting boron to the reactor core region) or automatically (such as inclusion of hydrogen-bearing materials in the moderator that reduce the moderation when the temperature rises). The accumulation of vapor from boiling can also be used to automatically reduce the moderator density and thus slow or stop the fission chain reaction if the reactor grows too hot. Thus, the reactor can self-control, without external intervention (e.g., control rods), to keep reactor temperature at or below the boiling point. A heat exchanger in the borehole serves to heat a separate reservoir of water that circulates to the surface, thus bringing heat, uncontaminated by radioisotopes, to the surface. Sides of the borehole (or in some aspects, a drillhole casing) can function to bring lower pressure water to the heat exchanger, where it can boil, to deliver power to the surface in the form of steam. Because the reactor is below millions to billions tons of rock, the reactor can be installed in the borehole without a separately installed or conventional containment building. Further, because the reactor is in a geologic formation in which the ambient water or brine pressure is comparable to that in a pressurized water reactor (PWR) or boiling water reactor (BWR), no thick-walled pressure vessel is needed.

For example, the present disclosure describes one or more fuel assemblies similar in configuration and size to those of a PWR or BWR fuel assembly placed near the bottom of a vertical borehole (e.g., 1.5 km deep borehole). The assembly is surrounded by "water" (e.g., water or water with additives such as soluble neutron poisons)), to make the fissile fuel (e.g., uranium with greater than 0.7% uranium-235 (U-235), or which contains plutonium-239 (Pu-239), or which contains both uranium and plutonium) undergo a fission chain reaction. In other embodiments, other materials such as graphite or uranium-zirconium hydride, can be used as a moderator. In some embodiments, a combination of moderators can be used, such as graphite and water.

In some aspects, the fuel assemblies are placed inside canisters that have open bottoms and tops. In example embodiments, if the water in the fuel assembly boils (that is, if the fuel rises above 325° C. for a reactor at a depth of 1.5 km) then gas will accumulate in void collectors, and the fission chain reaction will reduce, until the temperature lowers. Thus, the temperature of the reactor can be self-regulated at or about 325° C. The temperature can be regulated at lower temperatures at lesser depths, and at higher temperatures at greater depths.

Above the reactor in the borehole is a heat exchanger that removes heat from the reactor. In this embodiment, the heat exchanger also isolates the water (e.g., as a primary coolant) from a flow of water (e.g., as a secondary coolant) that is brought to the surface to carry the heat upward. The heat can be carried from the fuel to the heat exchanger using a pump or using natural circulation from heat-driven convection. The light water that brings the heat to the surface can do so using natural circulation, or by being actively pumped. The secondary water can be kept pressurized so that the water reaches the surface as hot water, or the water can be allowed to boil in the heat exchanger and come to the surface as steam.

Fresh (non-saline) water can be used as the fluid that carries the heat to the surface or near surface, but other fluids can also be used, such as brine, hydrocarbons, or gas such as helium or nitrogen. If a gas is used, then the gas conveyance pipe can be surrounded by a fluid filled pipe (containing, for example, fresh water) that provides emergency core cooling for the reactor. Otherwise, if water is used as the secondary fluid, then this water can also serve as a source for an emergency core cooling system (ECCS).

The upward flowing hot fluid can be partially isolated from the surrounding rock, and from the downward flowing cool water, by insulators. The rock formations surrounding the hot upward flowing pipe can also serve as an insulator. As the temperature of this rock rises, the rate of heat flow from the upward flown hot pipe into the surrounding rock will diminish, and thus the rock, once heated, serves as an insulator.

Figure 2:
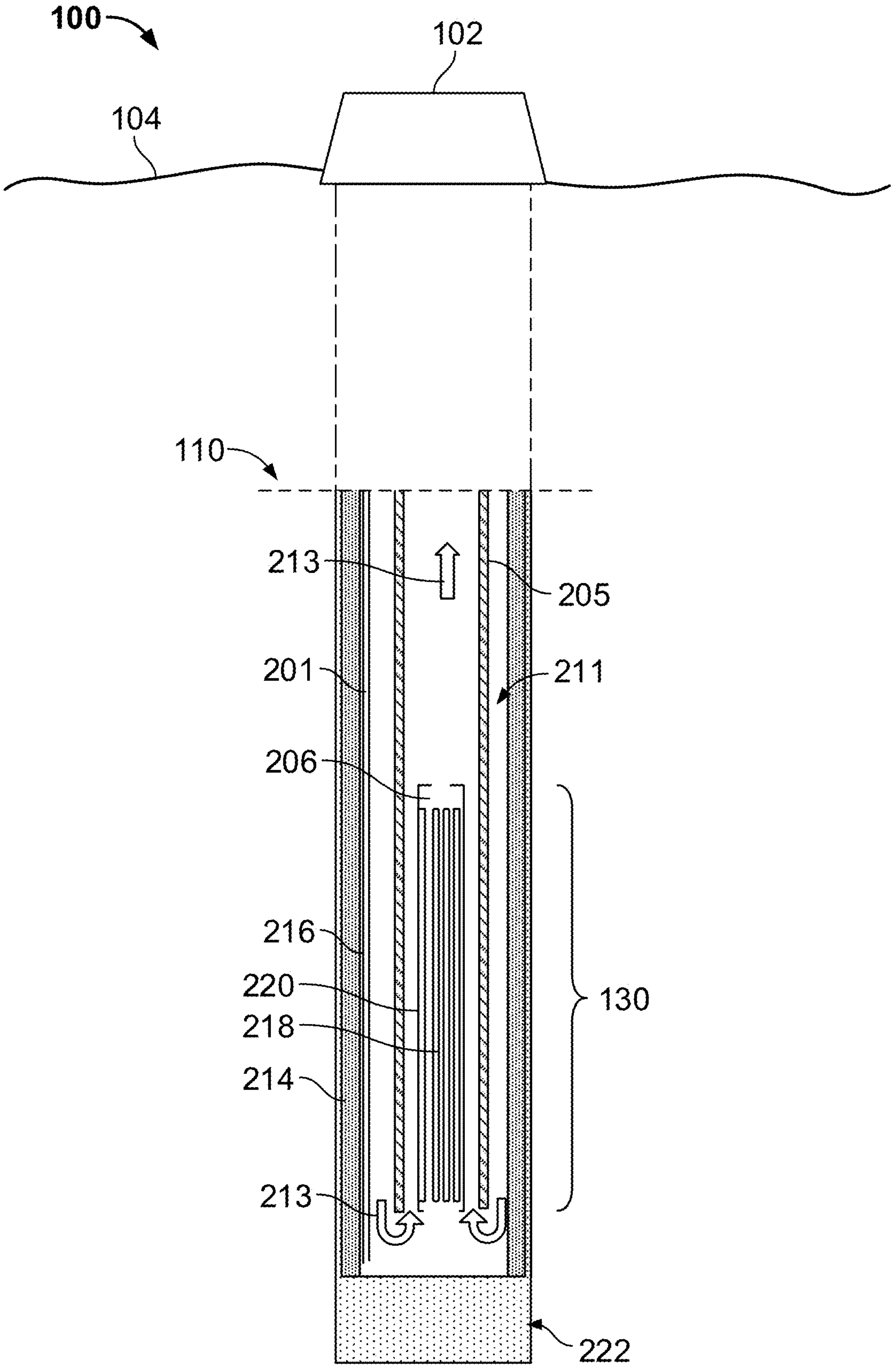
Figure 3:
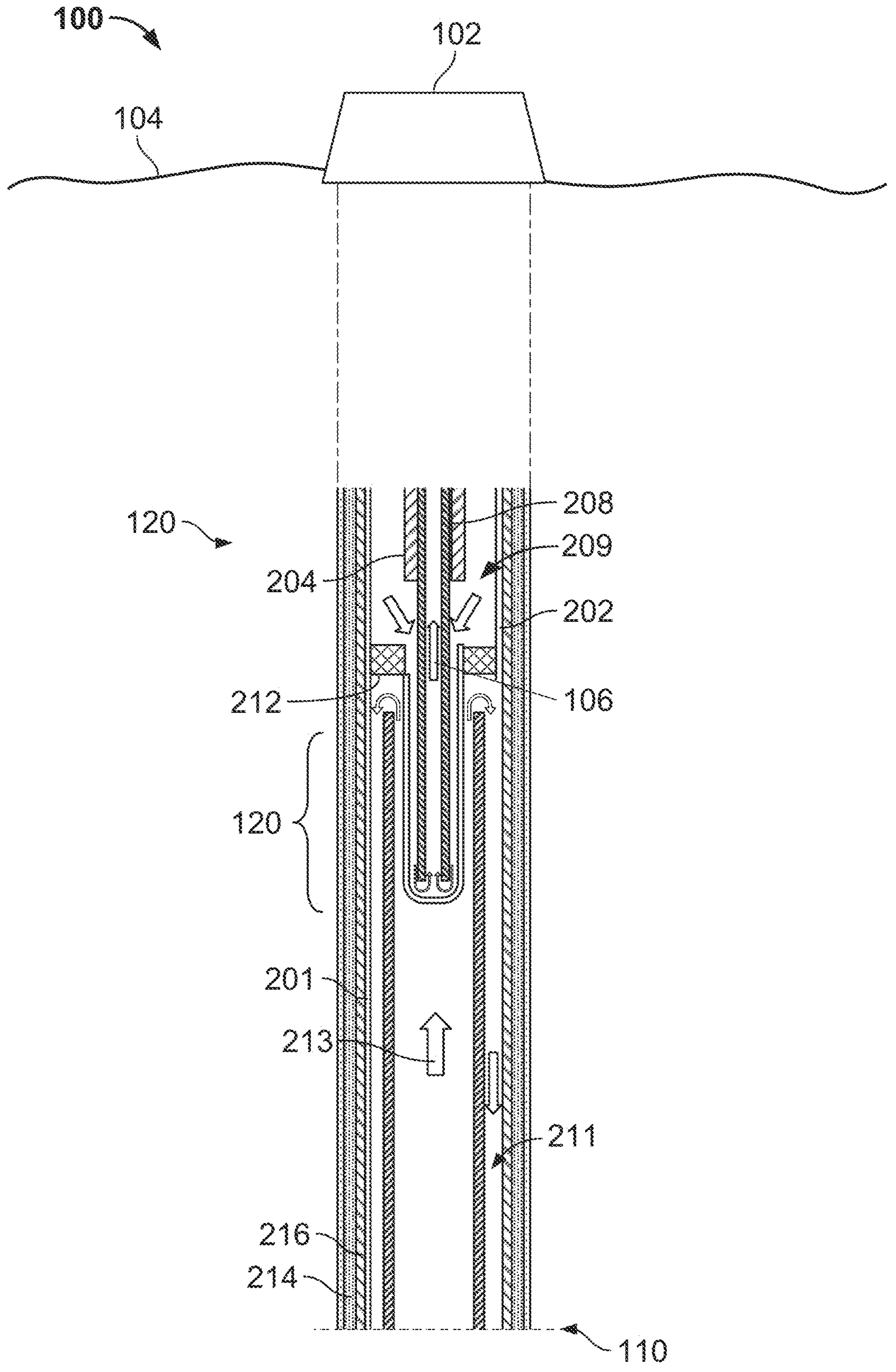

A diagram of an example reactor system 100 is shown in FIGS. 1 to 3. FIG. 1 is an overview of a borehole nuclear reactor system for the embodiment of a vertical borehole. In this embodiment, only one hole is depicted, and it contains only one fuel assembly. In other embodiments, multiple fuel assemblies can be placed in a drillhole, either vertically arranged, or spread though branches in the borehole. Further, multiple drillholes can be used to increase the total power delivered to the surface or near surface. In addition, once the fuel in a borehole reactor is depleted, it can be removed, or, in the preferred implementation, left it place, covered with sand or other support, and a second nuclear reactor placed above it. FIG. 2 shows the reactor section of the borehole nuclear reactor system. FIG. 3 shows an example heat exchange section of the borehole nuclear reactor system. The dashed line 110 represents the same level, or depth, in FIGS. 1 to 3. All materials in the reactor can be designed for low corrosion. One method of doing this is to include anti-corrosion materials in the fluids. Another is to make the pipes and other parts from low or non-corrosion materials including plastics. A third is to coat the metal surfaces with anti-corrosive materials, including quartz and diamond. Other methods can be evident to an engineer practiced in the anti-corrosion field.

Ultimately, when the reactor fuel is spent, the fuel can be removed from the drillhole, or left at depth, with the drillhole sealed (e.g., with a drillhole plug or otherwise). The casing to the surface can be left in place or cut and pulled out. The fuel might never be removed from the borehole 115. In some cases, the fuel can be disposed in the borehole 115 by sealing the borehole 115 above the reactor when the fuel is spent. Such borehole disposal offers very high levels of safety. The reactor system 100 may be less expensive to build and operate compared to a standard BWR or PWR reactor. Thus, in some examples, the fission chain reaction can be designed to burn more slowly. The reactor system 100 can thus operate for long periods of time, e.g., thirty to sixty years or longer, with need for no or few replacements of the nuclear fuel. In addition, fuel that is more highly enriched than typically used in a commercial nuclear reactor (e.g., about 4%) can be used to extend the working lifetime of the borehole reactor, that is, the time that it can deliver useful power without requiring the use of additional fuel. One example of such fuel is high assay low enriched uranium (HALEU) which is typically enriched to almost 20% U-235. Another example embodiment is that when the fuel has become sufficiently spent, that is the amount of fissionable material such as U-235 has been significantly reduced, that instead of removing the fuel assembly, it can be left in place, and a new fuel assembly put in position closer to the access hole. Doing this allows the highly radioactive spent fuel to remain safely at depth, where it will eventually be disposed by the action of sealing the borehole above the new fuel assembly (i.e., at a location in the borehole that is closer to the surface than the new fuel assembly). The reactor system 100 can be used to provide heat in the form of hot water, steam 106, and/or by using a power conversion system, e.g., generator 102. The generator 102 can be, for example, a turbine or thermocouple stack or other heat-driven generator. The heat can also be used for commercial purposes (such as heating buildings or for heat-intensive industry) without conversion to electricity.

FIG. 1 is an overview of a borehole nuclear reactor system 100. FIG. 1 includes a reference arrow 105 defining uphole and downhole directions. This figure shows a vertical borehole, but the borehole can be directionally drilled into a slanted or near-horizontal or other configuration. A generator 102 is located at a ground surface 104. A vertical borehole 115 descends to a depth of approximately one-half kilometer (km) or greater (e.g., 1.0 km or greater, 1.5 km or greater, 2.0 km or greater, or other predetermined depth). The borehole 115 includes a casing 216 that can be made to adhere to the borehole wall, e.g., by being cemented with cement 214 to the borehole wall.

In some aspects, a gap can also be left between the casing and the borehole wall, so that water that typically fills this gap will boil and become steam, and that steam can help to provide insulation reducing subsequent heat flow into the rock. The borehole 115 can be narrow, e.g., four to thirty-six inches in diameter.

At the bottom of the borehole 115, nuclear fuel is held in a reactor 130 including one or more fuel assemblies (or rods) 218. Details of the reactor 130 are described with reference to FIG. 2. In some examples, the reactor 130 includes an individual fuel element, or fuel rod 218. The reactor 130 is surrounded by a moderator. In some examples, the moderator is water. The reactor section is isolated from the surface 104 by a heat exchanger 120 and a pressure equalizer barrier 212 (shown in FIG. 3). The water serves as both coolant and moderator. The water flows by natural circulation to the heat exchanger 120 above the reactor 130 through hot water pipe 205 and from the heat exchanger 120 to the reactor 130 in an annulus 211 outside of the pipe 205.

An insulated pipe 208 is positioned in the borehole 115. During operation, water 108 flows downward in an annulus 209 outside of the pipe 208. The secondary water 108 is heated by the primary water as the secondary water 108 passes through the heat exchanger 120. The heated water, or steam 106, then flows upward inside the pipe 208. The pipe 208 thus carries heat generated by the reactor 130 to the surface 104.

Many methods can be used to cause the fuel to become critical, that is, to undergo a sustained chain reaction. One method to accomplish this can be to use a "neutron reflector", a material that has low neutron absorption properties, and which can scatter the neutrons that are leaving the reactor region back into it. In some instances, the neutron reflector is made of graphite (carbon) or beryllium. These materials can also serve to help moderate the neutrons.

Referring to FIG. 3, the heat exchanger 120 is depicted in a simplified schematic. Any appropriate heat exchanger system can be used for removing heat from the reactor 130. The primary water is fluidly isolated from the secondary water by a barrier, e.g., pressure equalizer barrier 212. The pressure equalizer can be omitted if it is desired to maintain the secondary water at a lower pressure to facilitate boiling. The barrier is positioned above the region of the system 100 in which heavy water flows, and in which the reactor 130 is located.

The system 100 includes primary water supply and drain pipes 201 and 202, respectively. The primary fluid supply and drain pipes 201, 202 can be used to replace the primary fluid (or part of it) and also to provide pressure control for the reactor 130. In some implementations, two small pipes, e.g., water supply and drain pipes 201, 202, penetrate the pressure equalizer barrier 212. The pipes 201, 202 can be used to partially replace or remove the primary water near the reactor. For example, the primary water, which might initially contain dissolved boron salts, can be replaced with fresh water, brine, or water with additional boron salts (material that quenches the fission chain reaction).

The use of boiling (creation of gas) to reduce reactivity and thus control the chain reaction is called a "negative void coefficient." Other methods to control the reactivity are well-known in the reactor design community. They include use of neutron reflectors and absorbers with efficiency that is temperature dependent. In addition to these passive (not moving) methods, control rods can be inserted into or near the reactor. These can be controlled from the surface, or they can automatically move into the reactor region when the temperature rises. Such movement can be controlled by using materials with a temperature coefficient of expansion large enough to allow a mechanism to move the control rods. Such mechanisms are found, for example, in bimetallic thermometers in which relatively small expansion can be used to drive a readout needle over a large distance.

The pipes 201, 202 can provide control of the content of the fluid in the reactor (for example, channeling the boron concentration), and they can also provide pressure stability. In another configuration, there can be a second pipe that goes from the reactor region to the surface to provide pressure stability. For example, when bubbles form, the space taken by the bubbles pushes water up the pipe instead of causing reactor pressure to increase. Such a pipe need not circulate water; the pipe allows enough flow upward to prevent an increase in pressure in the reactor section. The fission chain reaction can be turned off, if desired, by pumping out, e.g., pure primary water and replacing that water with water containing a neutron poison (that is, a material that absorbs neutrons), or high pressure gas such as argon or nitrogen.

The pressure equalizer barrier 212 between the primary water and secondary water provides an alternative (to the pipe described in the prior paragraph) or redundant method to control the pressure in the reactor. The barrier 212 can also be placed between the primary water and the brine from the local rock formation, to maintain the pressure of the primary system as equal to or approximately equal to that of the host rock formation. The barrier 212 can be formed from a flexible material that bends when the pressures are unequal, for example, in the form of a bellows. In another instance, the barrier 212 can be a tube with a non-circulator cross section that compresses or becomes more circular depending on the pressure difference inside and outside of the tube. In some examples, the pressure equalizer barrier 212 can be composed of a permeable material, such as sandstone or sand that allows flow whenever the pressures are unequal across the barrier. Although a permeable plug could allow some mixing between the moderating material (such as heavy water) and either the rock brine or the heat extraction fluid (secondary water), under normal operations the amount of mixing will be small. The mixed water can be replaced in the reactor by using the primary drain and supply pipes 201, 202. The primary drain and supply pipes 201, 202 can be filled with water near the bottom, and include a moveable plug part way up, with other water filling above the movable plug.

The hydrostatic weight of the water in the pipes 201, 202 can supply about one hundred atmospheres of pressure. The pressure can be controlled in several ways. The top of the water pipes 201, 202 can have gas at the top that allows the water to flow up the pipe (if bubbles are produced in the reactor) without significantly increasing the pressure in the reactor 130. The pressure of the water will be equal to the hydrostatic pressure of water at the bottom of the pipes 201, 202 which (if they go to the surface 104) can be fifty to one hundred-fifty atmospheres or more.

The water pipes 201, 202 can be used for an emergency replacement of the moderator, if there is a desire to turn off the nuclear reactor 130, or for replacement by neutron-poisoned water. Thus, the waterpipes 201, 202 can function as reactivity control mechanisms for the reactor. In some examples, control rods can be included in the reactor 130. Any appropriate method of controlling reactivity of the reactor 130 can be implemented.

In FIG. 2, the fuel, e.g., fuel rods 218, is held inside a canister 220. The bottom and the top of the canister 220 are left open to provide a pathway for the primary coolant loop 213. If the fuel overheats, that is, rises in temperature sufficiently to boil the water in the primary loop (which, at PWR pressures, occurs at a temperature of 250 to 325° C.) then the bubbles, or vapor 206, will reduce the density of the moderator near the fuel rods 218, and reducing the rate of the fission chain reaction. Thus, the formation of bubbles provides "negative feedback" to control and stop a power production overrun. Thus, the bubble capture mechanism provides "negative feedback" to control and stop a power production overrun.

To enhance the negative temperature coefficient from voids, inverted cups or tubes can be placed in the reactor to trap bubbles. These inverted cups can also be elongated in shape, like conventional "test tubes," to provide more gas accumulation capability The cups can be made of a thermally-conductive metal such as zircoloy to assure that they can transfer heat from the fuel rods to the part of the liquid coolant.

The flow of the secondary coolant fluid can be provided by a pump or by natural circulation. If the pump fails, or is turned off, then the circulation of the secondary water will be reduced, and more of the heat will be transferred to the secondary water and then to the surrounding rock 222. In some examples, the secondary water can be a power conversion working fluid of a power conversion system. For example, the secondary water, when heated to steam 106 by the heat exchanger 120, can be used as a power conversion working fluid for a steam turbine generator, e.g., generator 102.

The design in FIG. 3 shows the pipe 208 that brings the hot water 106 (or steam 106) to the surface 104 as being insulated with an insulator 204. Insulation can be added to various parts of the system 100 to improve efficiency. In another embodiment, the hot $H_2O$ pipe 208 can be used for cool water supply, and the cool water pipe 201 can be for hot water return. In this alternate embodiment, as well as in the embodiment shown in the figures, insulation between the outer pipe 201 and the casing and rock might be reduced or omitted. Doing this can cause the rock surrounding the casing to either warm or cool, respectively, although that can take longer to take place. Similarly, if insulation is used between that pipe and the casing, the temperature of the rock can still change with time since the insulator is not perfect. In these embodiments, the temperature of the rock will eventually be close to that of the pipe, and when this happens, the rock itself serves as an effective insulator against future loss of energy through the rock.

Various embodiments that are exemplified in FIGS. 1-3 can be implemented in accordance with the present disclosure. In some examples, carbon (e.g., low boron graphite) can be added to the design to provide a component of the moderator that will not boil and also operate as a neutron reflector to increase the reactivity. A hydrogen-bearing compound such as uranium-beryllium-hydride can be added because it gives a very strong negative temperature coefficient. The enrichment of the fuel can be as low as natural uranium (0.7%), at approximately the level typically used in a PWR (4.5%), as high as enrichment levels used in many "fourth generation" nuclear reactors (19.9%), or higher.

Any appropriate type of pressure equalizer can be used. Any appropriate type of heat exchanger can be used. In some examples, the concrete, or cement 214, between the casing 216 and the borehole wall can be omitted. Casing centralizers can be used to provide stability of the pipes.

The secondary water brought to the surface 104 can be kept pressurized, so it reaches the surface 104 as a liquid, or the secondary water can be allowed to boil in the heat exchanger, so the secondary water arrives at the surface 104 as steam 106.

Other forms of fuel and moderators can be used, including TRISO fuel and pebble fuel (typically containing TRISO in larger pellets), and molten salt or molten metal containing fissile material. The reactor system 100 can use a heat pipe in the vertical section to bring the heat to the surface 104. This can similarly allow the water to boil at depth. In an implementation including a heat pipe, pressure for the secondary water can be supplied by the secondary water pipes.

Other aspects of example embodiments according to the present disclosure can include one or more other features. For example, a turbine to generate electricity can be placed inside the borehole 115 to extract energy while keeping most of the borehole pressurized. The borehole 115 can be slanted or otherwise directionally drilled, rather than vertical. There are many more variations that are evident to someone practiced in the field of hydrology, heat transfer, and nuclear power.

The reactor system 100 can be designed to deliver a low level of power (e.g., heat, electrical power) for a short period or for an extended period (thirty to sixty years or more) by using control rods and neutron poisons to reduce the rate of fission reactors while keeping the reactor critical. The power delivered can also be extended by use of more highly enriched fuel, or by using multiple fuel assemblies or inserting new reactors in the same hole once the fissile fuel in the previous reactor has become depleted. At the end of that period, the spent fuel can be recovered. However, this design offers the option of leaving the spent fuel at depth and sealing the reactor. The borehole 115, in appropriate geologies (e.g., low permeability rock, no deep aquifers, little vertical flow of brine within the rock) can offer high levels of protection to humans at the surface 104 for a million years or longer.

The hot water (or steam 106) that reaches the surface 104 can be used directly for heat, or to produce electricity using a steam turbine, thermopile, or other electric generator, e.g., generator 102. The steam 106 can also be used to run engines for other uses such as manufacturing. The ability to be local, or modular, the borehole nuclear reactor heat can be usefully used, for example, to heat a large building, campus, or to provide energy for a factory. In this aspect, the system 100 has an advantage over larger plants that must be located far from where the power is used.

The system 100 can also be used for military operations, in which a borehole of suitable size is dug in a few days, and a pre-fabricated reactor is lowered into the borehole. For military use, the depth of the reactor offers a very high level of military "hardness," that is, invulnerability to attach by missile, drone, bomb, or terrorist attack. If it is necessary to abandon the reactor, the vertical access hole can easily be destroyed by inserting explosives. Further, at an end of life of system 100 (e.g., when the fissile material is no longer capable of sustaining a nuclear reaction as desired), the reactor portion and heat exchanger of the system 100 can be removed or may be allowed to remain in the borehole 115, which can be appropriately sealed to store the fissile material therein (permanently or temporarily).

The pressure equalizer barrier (212 in FIG. 3) or any direct interface between primary and secondary circulation systems, can also serve as a safety mechanism. It can be made in such a way that it will be opened if the pressure difference grows larger than a critical and undesired level, for example, if the reactor fluid boils too vigorously to be equalized by the plug or by the pipes 201 and 202. If that happens, then the hot reactor fluid will rise past this plug, and cool water from above the plug will flow down. This process provides "emergency core cooling system" (ECCS) as is required for PWR reactors under present code. This ECC is provided passively, that is, unlike the ECCS at many PWRs, it does not require outside power to be supplied to surround the reactor with cool water, but is gravity driven.

There are many variants on the idea of putting a nuclear reactor in a borehole. For example, two holes can be drilled that converge just above the heat exchanger. In this embodiment the hot water can come to the surface from the second hole, and the first hole can be used to supply cold water, provide a path for the replacement water supply, provide a pathway for control of control rods (which can be operated electrically with an underground motor or by cables that rise to the surface or near surface). The separation of the two holes allows rock to serve as the insulator between the cold and hot water. Bringing two holes together at depth is a technology that is within the state-of-the-art of current drilling practice. In another embodiment, three holes are dug, one of relatively large diameter to emplace the fuel assembly and heat exchanger, a second to provide a path for the hot water to come to the surface, and a third to provide pressure a pathway for injection and removal of fluids into the reactor region. Those fluids might include water or a fluid carrying neutron absorbing poisons. The supplementary holes (all but the one that allows for placement of the fuel and the heat exchanger) need not be wide in diameter, but can be between 2-inches and 10-inches in diameter, enabling them to be constructed at relatively low cost. Additional boreholes that intersect the main large-diameter borehole are also possible, and can serve to improve the efficiency or safety of the borehole reactor.

Figure 4:
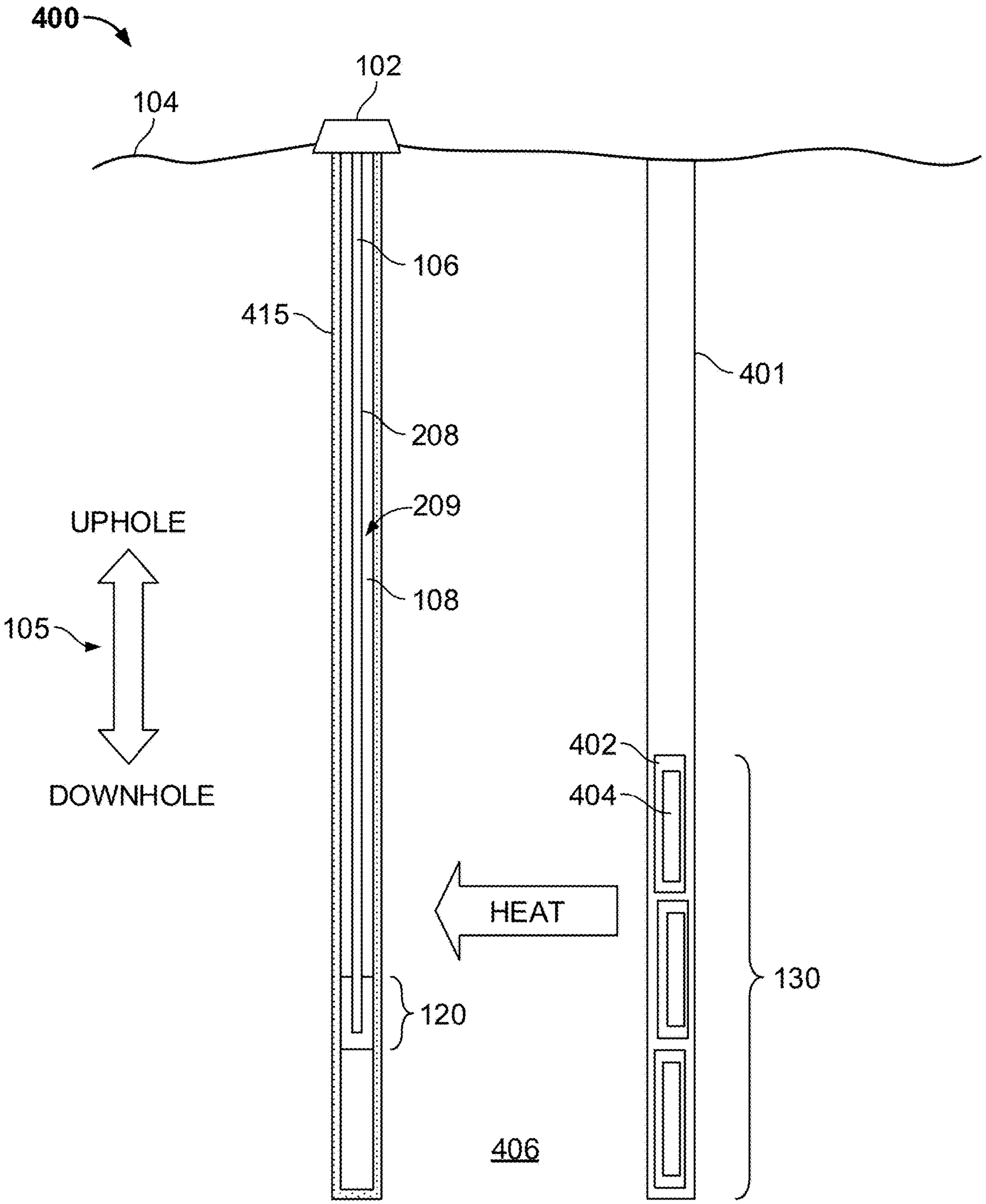
FIG. 4 is a schematic diagram of another example implementation of a drillhole (or borehole) nuclear reactor system according to the present disclosure.

FIG. 4 shows another example implementation of a drillhole (or borehole) nuclear reactor system 400 according to the present disclosure. Borehole nuclear reactor system 400 is a variation of system 100, as the same or substantially similar components as shown in FIG. 1 are included in FIG. 4, but nuclear fuel that generates heat is disposed of or otherwise positioned in a waste drillhole 401 that is separated from a heat exchanger borehole 415 by the rock formation 406. Therefore, the heat exchanger 120 (as described previously) is positioned in a separate borehole than the reactor 130 that includes, for example, one or more waste canisters 402 that enclose nuclear waste 404 (together which form the reactor 130). The nuclear waste 404 in canisters 402 are positioned in waste drillhole 401, which is formed from the ground surface 104 into one or more subterranean formations including rock formation 406. The waste drillhole 401 is shown as a vertical drillhole (e.g., wellbore or borehole) but can be directional, slanted, horizontal, or a combination thereof. Details of the reactor 130 are described with reference to FIG. 2.

FIG. 4 includes reference arrow 105 defining uphole and downhole directions. This figure shows a vertical heat exchanger (HX) borehole 415, but the borehole 415 can be directionally drilled into a slanted or near-horizontal or other configuration. The generator 102 is located at the ground surface 104. The HX borehole 415 can descend to a depth of approximately one half kilometer (km) or greater (e.g., 1.0 km or greater, 1.5 km or greater, 2.0 km or greater, or other predetermined depth). The HX borehole 415 can include a casing that can be made to adhere to the borehole wall, e.g., by being cemented with cement to the borehole wall. The HX borehole 415 can be narrow, e.g., four to thirty-six inches in diameter.

At the bottom of the HX borehole 415, nuclear fuel is held in a reactor 130 including one or more fuel assemblies. A pipe 208 (insulated or uninsulated) is positioned in the HX borehole 415. During operation, secondary water 108 flows downward in the annulus 209 outside of the pipe 208. The water 108 is heated (by heat that is transferred to the primary water from the nuclear waste 404 of the reactor 130 through the rock formation 406) as the secondary water 108 passes through the heat exchanger 120. The heated secondary water, or steam 106, then flows upward inside the pipe 208. The pipe 208 thus carries heat generated by the reactor 130 (in the separate, waste drillhole 401) to the surface 104.

Other variations on the disclosed implementations are also contemplated by the present disclosure. For example, a heat exchanger of a borehole nuclear reactor system, such as heat exchanger 120, can be positioned external to a casing in a borehole, such as between the casing and a rock formation. In some aspects, in such an implementation, cold water can be transported through a pipe external to the casing (e.g., within the rock formation, a cement layer that attaches the casing to the rock formation, or between the rock formation and the casing). The cold water is heated by the external heat exchanger into hot water or steam and brought to the surface 104 or near surface 104 where the heat can be used in the generator 102.

As another variation, a reactor for a borehole nuclear reactor system (such as reactor 130) can be split into or include multiple, independently-controllable reactors. For example, multiple reactors 130 within a reactor region can be operated simultaneously to provide maximum power, or individual reactors 130 can be periodically shut down or reduced in beat power output when less generated power is needed or desired. The control of each reactor 130 (of multiple reactors 130) can be accomplished by, for example, putting a strong neutron absorber in a vicinity or one or more of the multiple reactors 130. This can be done, for example, by having tubing or pipes that extend from the one or more reactors 130 to the surface 104. If the tubes are filled with water, then a particular reactor 130 will produce maximum power. If filled with a fluid containing a strong neutron absorber, such as boron or cadmium or their salts, then the reactivity of the particular reactor 130 can be reduced. A set of tubes (supply and return fluids) could be installed and provided for each reactor 130 of multiple reactors 130.

In some aspects, control of one or more of the multiple reactors 130 can be accomplished with control rods (e.g., solid control containing boron or cadmium or their salts) that are controllably moveable into and out of individual reactors 130. The controllable movement of the control rods can be performed mechanically or hydraulically, such as by using fluids in pipes that are controlled at or near the surface 104.

Figure 5A:
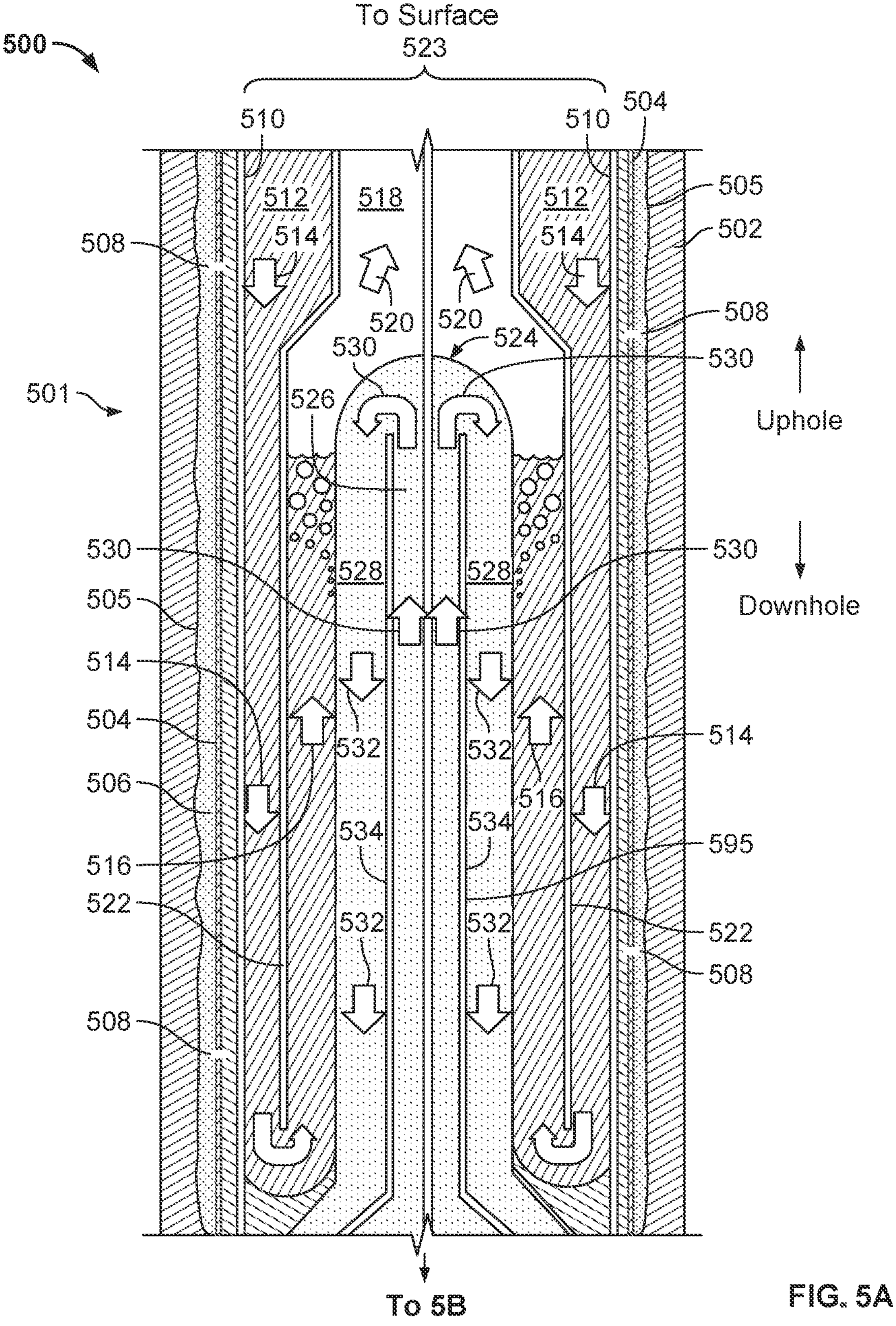
FIGS. 5A and 5B are schematic diagrams of another example implementation of a drillhole (or borehole) nuclear reactor system according to the present disclosure.
Figure 5B:
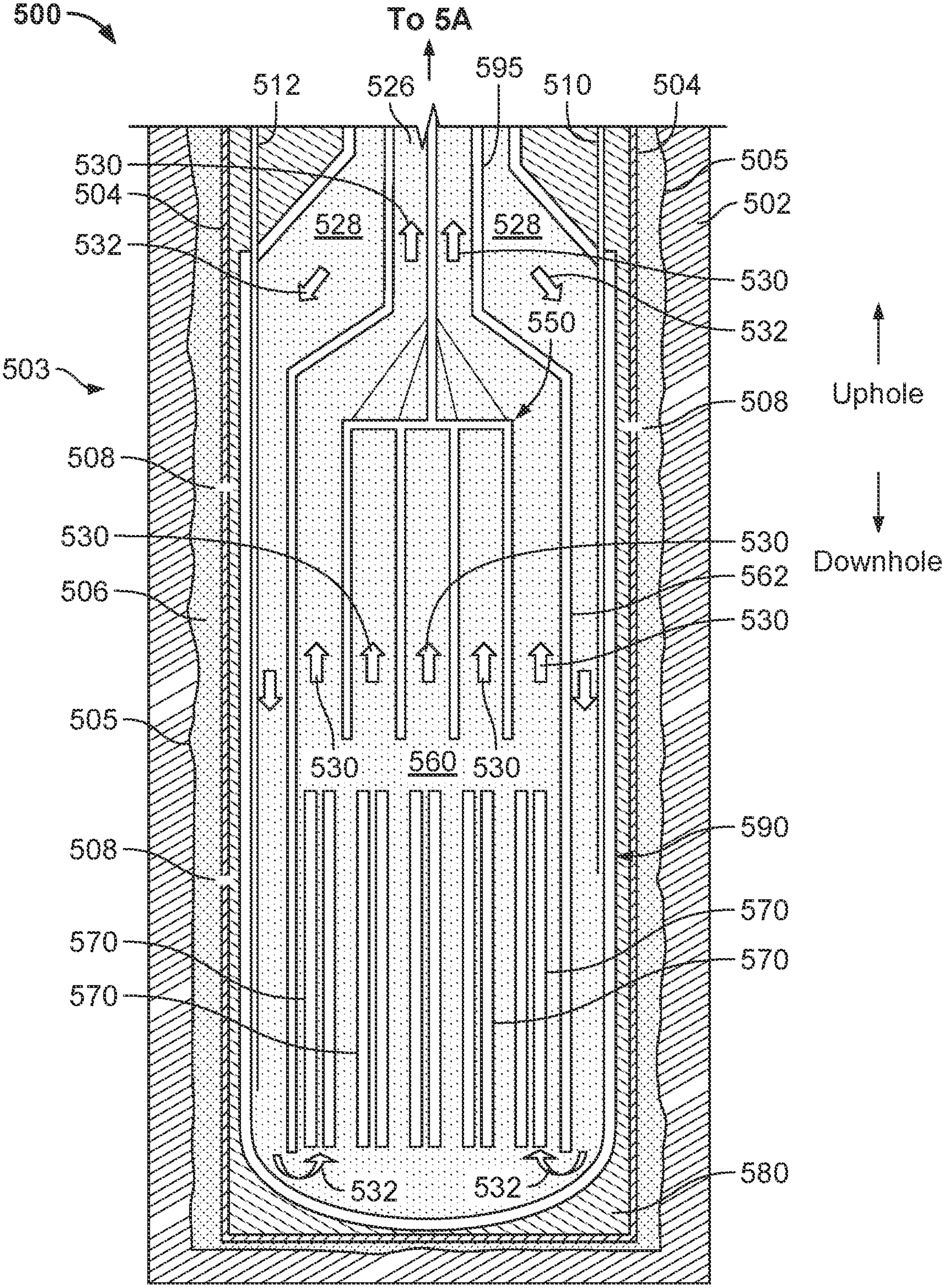

FIGS. 5A and 5B are schematic diagrams of another example implementation of a drillhole (or borehole) nuclear reactor system 500 according to the present disclosure. System 500 is similar in some or most aspects to the drillhole nuclear reactor system 100 and shown with more detail. FIG. 5A shows a heat exchanger portion 501 of the system 500, while FIG. 5B shows a nuclear reactor portion 503 of the system 500 (that is downhole of the heat exchanger portion 501). The heat exchanger portion 501 is positioned or installed in a borehole 505 that is formed from a terranean surface into a subterranean formation 502. In some aspects, the subterranean formation 502 can serve to moderate and reflect neutrons back into the nuclear reactor section 503 during a fission reaction generated therein.

In this example, the borehole 505 includes a casing 504 (that includes optional perforations 508) that is cemented into the borehole 505 with cement 506. In example implementations, the heat exchanger portion 501 if installed in a borehole 505 that is approximately 18 inches in diameter, and the portion 501 is approximately 40 feet in length.

As shown in FIG. 5A, the heat exchanger portion 501 includes a primary fluid flowpath 524 that includes a riser section 526 (within riser 595) and downcomer sections 528 (between the riser 595. The riser section 526 turns to the downcomer sections 528 at a closed end of the primary fluid flowpath 524 at or near an uphole end of the heat exchanger portion 501. In some aspects, an insulating layer 534 is installed between the riser section 526 and the downcomer sections 528. In combination, the riser section 526 and the downcomer sections 528 (i.e., the primary fluid flowpath 524) form at least a part of a closed-circuit for circulating (e.g., naturally or by convection or both) a primary fluid coolant therewithin between the nuclear reactor portion 503 and the heat exchanger portion 501. The primary fluid coolant can be water (e.g., heavy water, light water, or other water-based liquid with additives).

As further shown in FIG. 5A, the heat exchanger portion 501 includes a secondary fluid flowpath 523 that includes downflow sections 512 and upflow sections 518. Generally, the downflow sections 512 extend downhole in the borehole 505 from at or near a generator and condenser at the terranean surface until they turn at closed ends into the upflow sections 518, which also extend to the generator at the terranean surface. In some aspects, an insulating layer 522 is installed between the downflow sections 512 and the upflow sections 518. In combination, the downflow sections 512 and the upflow sections 518 (i.e., the secondary fluid flowpath 523) form at least a part of a closed-circuit for circulating (e.g., forcibly, naturally or by convection or a combination thereof) a secondary fluid coolant therewithin between the heat exchanger portion 501 and the generator at the terranean surface. As shown, the secondary fluid flowpath 523 and the primary fluid flowpath 524 are in thermal communication such that heat can be transferred from the primary fluid coolant to the secondary fluid coolant (as explained in more detail later), but the fluid flowpaths are fluidly decoupled so that mixing of the primary and secondary fluid coolants does not occur within the heat exchanger portion 501. The secondary fluid coolant can be light water other water-based liquid with additives.

Turning now to FIG. 5B, this figure shows the nuclear reactor portion 503 of the system 500. As shown, a reactor vessel 590 is installed in the borehole 505 (and likely within a brine 580 that fills the borehole 505). The reactor vessel 590 at least partially encloses a core 560 (defined by a core reflector 562) that includes nuclear fuel elements 570 and a control rod system 550 (that can be controlled from, e.g., the terranean surface). The downcomer sections 528 extend downhole into the core 560 at an outer circumference of the core vessel 562 until, at a closed, downhole end of the reactor vessel 590, they turn to meet the riser section 526 within the core 560 at the nuclear fuel elements 570. In some aspects, the core vessel 562 can comprise a neutron reflector surface that faces the nuclear fuel elements 570, as well as an insulating material that provides thermal separation between the downcomer sections 528 and the core 560. The nuclear reactor portion 503 can be, e.g., approximately 14-28 feet in length.

In some aspects, the core reflector 562 can be made of a material sufficient to reflect neutrons without absorbing the neutrons, such as, for example, carbon, beryllium (or any of their alloys). In some aspects, the subterranean formation 502 can act as a reflector or moderator of neutrons based on its geological properties. Thus, in combination, the core reflector 562 (if provided) and the formation 502 can operate in combination to contribute to the reactivity of the nuclear reactor portion 503. Additionally, or alternatively, the casing 504 can be made of a material sufficient to reflect neutrons without absorbing the neutrons (or otherwise act to increase reactivity), such as, for example, carbon steel or stainless steel. The casing 504 can also be made of a material such as ceramic, a plastic material, or fiberglass.

Figure 6:
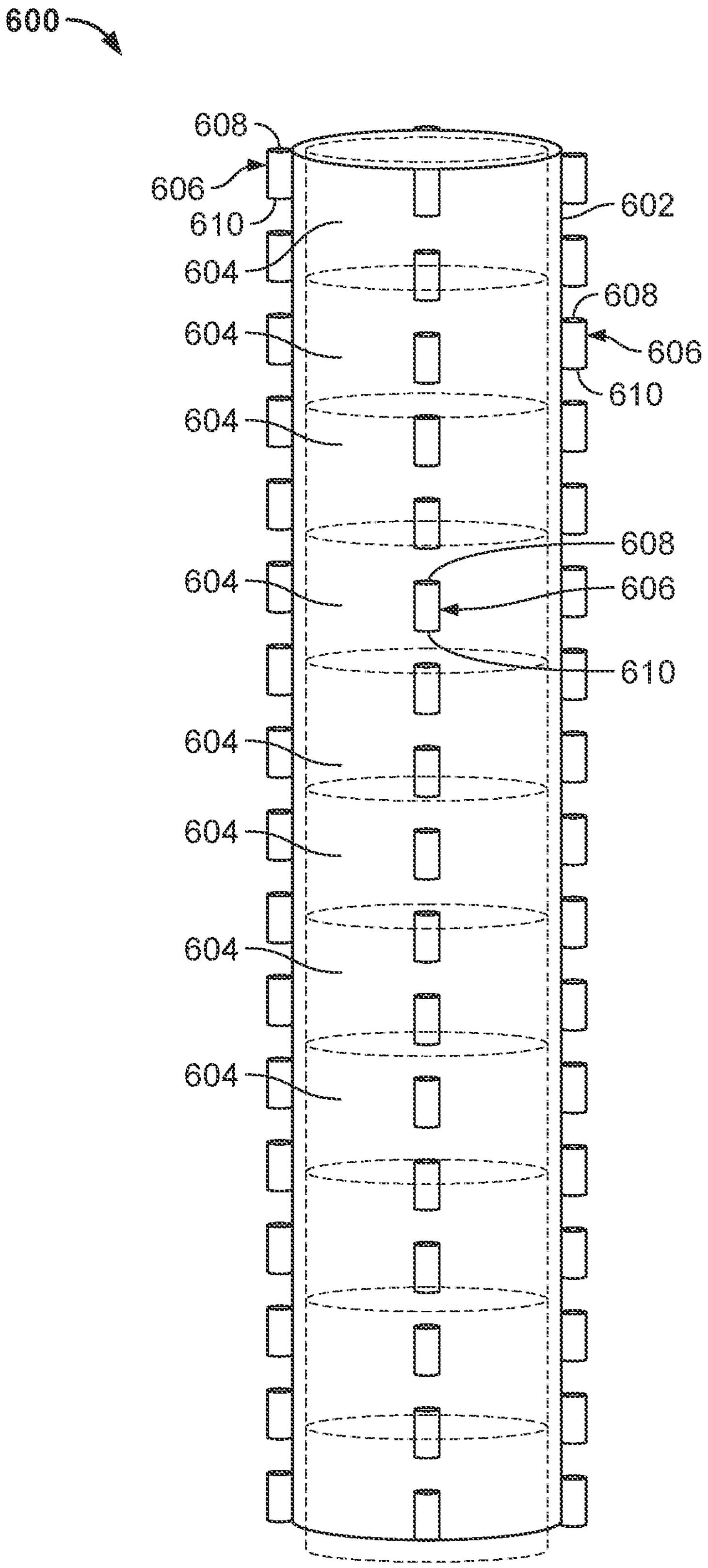
FIG. 6 is a schematic diagram of nuclear fuel element for a drillhole nuclear reactor system according to the present disclosure.

In some aspects, there can be one, some, or many nuclear fuel elements 570. For example, a nuclear fuel element can be a nuclear fuel assembly rod (e.g., with a cladding that holds nuclear fuel pellets, such as shown in FIG. 6). In some aspects, a nuclear fuel element can nuclear fuel (e.g., one or more nuclear fuel assemblies) enclosed in a canister. In some aspects, a nuclear fuel element can be another form of fissile material, such as TRISO fuel, metallic uranium or plutonium, oxides of uranium or plutonium, or mixtures of uranium and plutonium oxides (MOX).

As shown in FIGS. 5A and 5B, pressure control tubes 510 extend within the borehole 505 through the heat exchanger portion 501 and into the nuclear reactor portion 503. In some aspects, the pressure control tubes 510 allow pressure control of the fluid in the reactor system 500 and the insertion and removal of a primary reactor coolant fluid. In the case of pressure control, the tubes 510 allow the operator to set the pressure in the primary reactor loop to be close to the pressure of the brine 580 in the subterranean formation 502, thereby allowing the use of thinner and less expensive metal for the reactor vessel 595.

In an example operation of the borehole nuclear reactor system 500, the nuclear reactor portion 503 operates to heat (and re-heat, once cooled) a cool primary fluid coolant 532 that circulates (e.g., naturally, by convention, or both) from the heat exchanger portion 501 and into the core 560 through the downcomer sections 528. As the cool primary fluid coolant 532 rises through the core 560 and through nuclear fuel elements 570, the nuclear fuel elements 570 heat the cool primary fluid coolant 532 into hot primary fluid coolant 530 that enters the riser 595 and into the riser section 526.

The hot primary fluid coolant 530 flows through the riser 595 and the riser section 526 and into the heat exchanger portion 501 of the system 500. The hot primary fluid coolant 530 turns into the downcomer sections 528 at the closed end of the primary fluid coolant flowpath 524, and begins to transfer heat to a rising secondary fluid coolant 516 that circulates in the upflow sections 518 of the secondary fluid coolant flowpath 523. As heat is transferred, the rising secondary fluid coolant 516 can remain in liquid form or phase change (at least partially) to gas form in order to form steam 520 that, eventually, rises to the generator at the terranean surface.

The steam 520 that is used in the generator, generally, changes phase back to liquid and circulates through the downflow sections 512 as cold secondary fluid coolant 514. The cold secondary fluid coolant 514 circulates through the downflow sections 512 and into the upflow sections 518 within the secondary fluid coolant flowpath 523, where it is heated to the rising secondary fluid coolant 516.

This process repeats as the nuclear reactor portion 503 (and/or the generator) is in operation. In the case of, e.g., an uncontrolled fission reaction that occurs in the nuclear reactor section 503, or in order to abate a controlled fission reaction, the control rod assembly 550 can be operated (e.g., inserted into the core 560) to stop or reduce the nuclear fission reaction of the nuclear fuel elements 570.

Although a particular type of nuclear reactor is shown in the nuclear reactor portion 503, (enriched uranium, plutonium, their oxides, or mixed oxides) the present disclosure contemplates that many forms of nuclear reactors can be used with fissile materials that forms the nuclear fuel elements 570. For example, molten salt reactors, molten metal reactors, TRIGA reactors, TRISO fuel reactors, boiling water reactors, high temperature gas cooled reactors, or another kind of 4th generation reactors that can be installed in a human-unoccupiable borehole (such as borehole 505) are all contemplated by the present disclosure.

Furthermore, although a single nuclear reactor portion 503 is shown in FIG. 5B, there can be multiple nuclear reactor portions 503 (as well as multiple heat exchanger portions 501) installed in the borehole 505, whether within a single vertical borehole or multiple, slant or lateral boreholes from the borehole 505. Moreover, additional systems found in standard reactors, such as filtration systems, can be readily added to the reactors described here.

FIG. 6 is a schematic diagram of nuclear fuel element 600 (fuel "rod" or "pin") for a drillhole nuclear reactor system according to the present disclosure. This figure explicitly shows one implementation of the void collectors described previously. As shown in this example, nuclear fuel element 600 includes multiple fissionable nuclear fuel pellets 604 (or other, discretized form of fissionable nuclear fuel) within a cladding 602 (e.g., a metallic or other material that is in the form of a tube, such as zircaloy or an aluminum alloy). In some aspects, the nuclear fuel element 600 represents a nuclear fuel rod (of which many make up a nuclear fuel assembly within a support structure).

As shown in this example, multiple cups 606 are installed or attached to (or integral with) the cladding 602. Each cup 606 is inverted such that the cup 606 includes a closed end 608 and an open end 610. When installed in the nuclear reactor portion of a drillhole nuclear reactor system, the closed ends 608 face an uphole direction, while the open ends 610 face a downhole direction. Thus, the open ends 610 face (and receive) a flow of a primary fluid coolant in an uphole direction, through a core of the reactor, and into a riser of the reactor.

In some aspects, the cups 606 act as bubble catchers during operation of the nuclear reactor section. For example, the cups 606 can operate to accumulate primary fluid coolant in the form of vapor if the primary fluid coolant boils. In some aspects, the cups 606 can be formed such that they have small aspect ratios (e.g., the cup diameter is less, and perhaps much less, than a cup length). It is expected that many of the voids that are "captured" by the cups 606 will be generated inside the cups 606 but remain there instead of rising upward.

When the primary fluid coolant temperature drops, the vapor within the cups 606 will drop and convert back to liquid phase. Thus, the cups 606 can act to provide or enhance a negative temperature coefficient to the reactivity of the nuclear reactor portion of the drillhole nuclear reactor system.

Although the cups 606 are shown as cylinders, other shapes that have similar functionality can be used. The cups 606 can have good thermal contact with the cladding 602, so that they do not reduce the cooling of the cladding 602 by the primary fluid coolant. In some aspects they will enhance this cooling by providing additional surface area for the cladding.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A nuclear reactor system, comprising:

a drillhole that extends from a terranean surface through one or more subterranean formations;

at least one reactor core positioned in the drillhole, the reactor core comprising at least one nuclear fuel element positioned at a first depth of the drillhole below the terranean surface;

a heat exchanger positioned in the drillhole, the heat exchanger including a fluid barrier positioned at a second depth of the drillhole that is less than the first depth;

a primary coolant system positioned in the drillhole and configured to transport a primary fluid coolant between the at least one reactor core and the heat exchanger, the primary coolant system comprising:

a first pipe having a diameter less than a diameter of the drillhole and being positioned in the drillhole, the at least one reactor core being positioned inside of the first pipe; and a first annulus defined between the first pipe and a wall of the drillhole, wherein the first annulus surrounds the first pipe, wherein the primary coolant system is configured to convey the primary fluid coolant in a downhole direction through the first annulus from the fluid barrier to the at least one reactor core at the first depth, and wherein the primary coolant system is configured to convey the primary fluid coolant, heated by the reactor core, in an uphole direction inside the first pipe from the at least one reactor core to the fluid barrier at the second depth; and a secondary coolant system thermally coupled to the primary coolant system via the heat exchanger, wherein the secondary coolant system is configured to receive heat across the fluid barrier, the secondary coolant system comprising:

a second pipe having a diameter less than the diameter of the drillhole and being positioned in the drillhole; and a second annulus defined between the second pipe and the wall of the drillhole, wherein the second annulus surrounds the second pipe, wherein the secondary coolant system is configured to convey a secondary fluid coolant in a downhole direction through the second annulus from the terranean surface to the fluid barrier at the second depth, and wherein the secondary coolant system is configured to convey the secondary fluid coolant, heated in the heat exchanger by the primary fluid coolant, in an uphole direction inside the second pipe from the fluid barrier to the terranean surface, wherein the heated secondary fluid coolant is usable for generating power at the terranean surface.

2. The nuclear reactor system of claim 1, wherein the at least one nuclear fuel element comprises a fissile nuclear fuel element.

3. The nuclear reactor system of claim 2, wherein the fissile fuel element comprises at least one of enriched uranium, plutonium, uranium or plutonium oxide, or a mixed oxide (MOX).

4. The nuclear reactor system of claim 1, comprising at least one canister that at least partially encloses the at least one nuclear fuel element.

5. The nuclear reactor system of claim 4, wherein the canister includes a first opening at an uphole end of the canister and a second opening at a downhole end of the canister.

6. The nuclear reactor system of claim 1, wherein the primary coolant system is configured to transport the primary fluid coolant between the at least one reactor core and the heat exchanger by at least one of natural circulation or pumping.

7. The nuclear reactor system of claim 1, comprising one or more pumps configured to provide a force for transporting the primary fluid coolant between the at least one reactor core and the heat exchanger.

8. The nuclear reactor system of claim 1, wherein the secondary coolant system is configured to transport the secondary fluid coolant between the heat exchanger and the terranean surface by natural circulation.

9. The nuclear reactor system of claim 1, comprising one or more pumps configured to provide a force for transporting the secondary fluid coolant between the heat exchanger and the terranean surface.

10. The nuclear reactor system of claim 1, wherein the primary fluid coolant comprises water.

11. The nuclear reactor system of claim 1, wherein the secondary fluid coolant comprises water.

12. The nuclear reactor system of claim 1, wherein the heat exchanger is configured to transfer heat from the primary fluid coolant in the primary coolant system to heat the secondary fluid coolant in the secondary coolant system to a higher temperature liquid phase or a gas phase.

13. The nuclear reactor system of claim 1, comprising a power conversion system.

14. The nuclear reactor system of claim 13, wherein the power conversion system is located at the terranean surface.

15. The nuclear reactor system of claim 13, wherein the secondary fluid coolant comprises a power conversion working fluid of the power conversion system.

16. The nuclear reactor system of claim 1, wherein the first depth is:

0.5 km to 1.0 km from the terranean surface, 1.0 to 1.5 km from the terranean surface, or 1.5 km or greater from the terranean surface.

17. The nuclear reactor system of claim 1, wherein the fluid barrier is configured to fluidly isolate the primary coolant system from the secondary coolant system.

18. The nuclear reactor system of claim 1, comprising one or more pipes extending from the terranean surface to a third depth of the drillhole, the third depth being greater than the second depth.

19. The nuclear reactor system of claim 18, wherein the one or more pipes is configured to provide the primary fluid coolant to a region of the drillhole below the second depth.

20. The nuclear reactor system of claim 1, wherein a diameter of the drillhole is:

thirty-six inches or less, and eight inches or more.

21. The nuclear reactor system of claim 1, wherein the wall comprises a casing that is installed in the drillhole.

22. The nuclear reactor system of claim 21, wherein the casing is comprised of a material sufficient to act as a reflector to reflect neutrons generated in the at least one reactor core.

23. The nuclear reactor system of claim 21, wherein a material of the casing comprises at least one of carbon steel, stainless steel, ceramic, a plastic material, or fiberglass.

24. The nuclear reactor system of claim 1, wherein the at least one reactor core is controllable between a low power output and a maximum power output.

25. The nuclear reactor system of claim 24, wherein the at least one reactor core is controllable with a fluid that comprises a neutron absorber.

26. The nuclear reactor system of claim 25, wherein the neutron absorber is controllably added to the primary fluid coolant.

27. The nuclear reactor system of claim 24, wherein the at least one reactor core is controllable with at least one control rod configured to move near or adjacent the at least one nuclear fuel element.

28. The nuclear reactor system of claim 1, wherein the at least one reactor core comprises a first reactor core and the nuclear fuel element comprises a first nuclear fuel element, the system comprising a second reactor core positioned in the drillhole, the second reactor core comprising at least one second nuclear fuel element.

29. The nuclear reactor system of claim 28, wherein the first and second reactor cores are individually controllable between a low power output and a maximum power output.

30. The nuclear reactor system of claim 28, wherein each of the first and second reactor cores is individually controllable with a fluid that comprises a neutron absorber.

31. The nuclear reactor system of claim 30, wherein the fluid is individually transported to each of the first and second nuclear reactor cores through one or more tubes that extends from the terranean surface to the first and second nuclear reactor cores.

32. The nuclear reactor system of claim 31, wherein the neutron absorber is controllably added to the fluid.

33. The nuclear reactor system of claim 1, comprising one or more void collectors positioned in the primary coolant system and within a flowpath of the primary fluid coolant, wherein each void collector has a cup shape, a closed end of each void collector facing an uphole direction and an open end of each void collector facing a downhole direction.

34. The nuclear reactor system of claim 33, wherein each of the one or more void collectors is attached to a cladding of the at least one nuclear fuel element.

35. The nuclear reactor system of claim 1, comprising a reflector configured to reflect neutrons generated in the at least one reactor core without absorbing the neutrons.

36. The nuclear reactor system of claim 35, wherein the reflector comprises at least one of beryllium, carbon, a beryllium alloy, or a carbon alloy.

37. The nuclear reactor system of claim 1, wherein a particular subterranean formation, of the one or more subterranean formations, that is adjacent the at least one reactor core is configured to act as a reflector to reflect neutrons generated in the at least one reactor core.

38. The nuclear reactor system of claim 1, wherein the diameter of the second pipe is less than the diameter of the first pipe, and a downhole end of the second pipe extends into an uphole end of the first pipe.

39. The nuclear reactor system of claim 1, wherein a diameter of a downhole portion of the second pipe is greater than a diameter of an uphole portion of the first pipe, and an uphole end of the first pipe extends into a downhole end of the second pipe.

40. The nuclear reactor system of claim 1, wherein the fluid barrier includes a pressure equalizer barrier, the pressure equalizer barrier including a permeable material configured to permit fluid to flow through the pressure equalizer barrier, an amount of fluid flow through the pressure equalizer barrier being dependent on a difference in pressure across the pressure equalizer barrier.

41. A method, comprising:

operating a nuclear reactor system that comprises:

a drillhole that extends from a terranean surface through one or more subterranean formations;

at least one reactor core positioned in the drillhole, the at least one reactor core comprising at least one nuclear fuel element positioned at a first depth of the drillhole below the terranean surface;

a heat exchanger positioned in the drillhole, the heat exchanger including a fluid barrier positioned at a second depth of the drillhole that is less than the first depth;

a primary coolant system positioned in the drillhole, the primary coolant system comprising:

a first pipe having a diameter less than a diameter of the drillhole, the first pipe being positioned in the drillhole, the at least one reactor core being positioned inside of the first pipe; and a first annulus defined between the first pipe and a wall of the drillhole, wherein the first annulus surrounds the first pipe; and a secondary coolant system thermally coupled to the primary coolant system via the heat exchanger, wherein the secondary coolant system is configured to receive heat across the fluid barrier, the secondary coolant system comprising:

a second pipe having a diameter less than the diameter of the drillhole and being positioned in the drillhole, a second annulus defined between the second pipe and the wall of the drillhole, wherein the second annulus surrounds the second pipe, wherein the secondary coolant system is configured to convey a secondary fluid coolant between the heat exchanger and the terranean surface, the operating comprising:

transporting a primary fluid coolant in the primary coolant system in a downhole direction through the first annulus from the fluid barrier to the at least one reactor core at the first depth and in an uphole direction inside the first pipe from the at least one reactor core to the fluid barrier at the second depth;

transporting the secondary fluid coolant, heated in the heat exchanger by the primary fluid coolant, in the secondary coolant system in an uphole direction inside the second pipe from the fluid barrier at the second depth to the terranean surface;

generating power with the heated secondary fluid coolant at the terranean surface; and transporting the secondary fluid coolant in the secondary coolant system in a downhole direction through the second annulus from the terranean surface to the fluid barrier at the second depth.

42. The method of claim 41, wherein the fluid barrier fluidly isolates the primary fluid coolant from the secondary fluid coolant.

43. The method of claim 42, comprising transporting the primary fluid coolant into the drillhole through one or more pipes extending from the terranean surface to a third depth of the drillhole that is deeper than the second depth of the fluid barrier.

44. The method of claim 41, wherein the primary and the secondary fluid coolants comprise water.

45. The method of claim 41, wherein the at least one reactor core comprises a first reactor core and the at least one nuclear fuel element comprises a first nuclear fuel element, the nuclear reactor system comprising a second reactor core positioned in the drillhole, the second reactor core comprising at least one second nuclear fuel element.

46. The method of claim 45, comprising individually controlling the first and second reactor cores between a low power output and a maximum power output.

47. The method of claim 41, comprising maintaining pressure stability of the primary fluid coolant in the drillhole using one or more pipes extending from the terranean surface to a third depth of the drillhole that is deeper than the second depth of the fluid barrier.

48. The method of claim 41, wherein the fluid barrier includes a pressure equalizer barrier, the method comprising maintaining pressure stability of the primary fluid coolant in the drillhole using the pressure equalizer barrier.

49. The method of claim 48, wherein the pressure equalizer barrier includes a permeable material configured to permit fluid to flow through the pressure equalizer barrier, an amount of fluid flow through the pressure equalizer barrier being dependent on a difference in pressure across the pressure equalizer barrier.

* * * * *